(12) United States Patent
Lynch

(10) Patent No.: US 11,892,876 B1
(45) Date of Patent: Feb. 6, 2024

(54) SWIVEL PLATFORM ASSEMBLY FOR PORTABLE ELECTRONIC DEVICE STAND

(71) Applicant: Pioneer Square Brands, Inc., Seattle, WA (US)

(72) Inventor: Riley Edwin Lynch, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/240,302

(22) Filed: Aug. 30, 2023

Related U.S. Application Data

(63) Continuation-in-part of application No. 18/234,028, filed on Aug. 15, 2023, now Pat. No. 11,864,337, which is a continuation-in-part of application No. 18/224,528, filed on Jul. 20, 2023, now Pat. No. 11,805,873, which is a continuation-in-part of application No. 18/224,484, filed on Jul. 20, 2023, now Pat. No. 11,855,397.

(51) Int. Cl.
G06F 1/16 (2006.01)
F16M 11/10 (2006.01)

(52) U.S. Cl.
CPC .......... *G06F 1/1632* (2013.01); *F16M 11/10* (2013.01)

(58) Field of Classification Search
None
See application file for complete search history.

(56) References Cited

U.S. PATENT DOCUMENTS

| | | | | |
|---|---|---|---|---|
| 5,923,528 | A * | 7/1999 | Lee | G06F 1/1601 248/921 |
| 6,189,842 | B1 * | 2/2001 | Bergeron Gull | F16M 11/24 248/283.1 |
| 6,302,617 | B1 * | 10/2001 | Rumpp | F16B 21/02 403/348 |
| 6,443,408 | B1 * | 9/2002 | Hung | F16M 11/2021 248/176.1 |
| 6,510,049 | B2 * | 1/2003 | Rosen | F16M 13/027 D14/336 |
| 6,966,532 | B2 * | 11/2005 | Ishizaki | F16M 11/105 361/679.61 |
| 10,875,467 | B2 * | 12/2020 | Keller | H04M 1/04 |
| 11,204,130 | B2 * | 12/2021 | Wang | B60R 11/0241 |
| 11,744,027 | B2 * | 8/2023 | Hsu | F16M 11/041 361/807 |
| 2002/0181722 | A1 * | 12/2002 | Hibino | G06F 1/1671 348/E5.025 |
| 2005/0041379 | A1 * | 2/2005 | Jang | F16M 11/045 248/917 |
| 2007/0064379 | A1 * | 3/2007 | Shin | F16M 11/2064 361/679.06 |

(Continued)

*Primary Examiner* — Xanthia C Relford
(74) *Attorney, Agent, or Firm* — Grandview Law

(57) ABSTRACT

Systems involve implementations including a swivel platform system with upper and lower assemblies that rotate with respect to each and include base members that are co-planar. The system further includes a bushing that couples the upper and lower assemblies together with all three components including apertures with centers that are co-axially positioned along the axis of rotation of the upper and lower assemblies. The upper assembly is couplable to a stand for a portable electronic device. Other aspects are described in the claims, drawings, and text forming a part of the present disclosure.

19 Claims, 23 Drawing Sheets

(56) References Cited

U.S. PATENT DOCUMENTS

| | | | |
|---|---|---|---|
| 2008/0006748 A1* | 1/2008 | Watanabe | F16M 11/22 |
| | | | 248/186.2 |
| 2015/0211675 A1* | 7/2015 | Shyu | F16M 11/105 |
| | | | 248/125.7 |
| 2017/0327054 A1* | 11/2017 | Yu | B60R 11/0241 |
| 2018/0032104 A1* | 2/2018 | Schatz | G06F 1/1683 |
| 2019/0327841 A1* | 10/2019 | Li | F16M 11/2021 |
| 2019/0357368 A1* | 11/2019 | Huang | F16M 11/105 |
| 2020/0300407 A1* | 9/2020 | Lee | F16M 11/105 |
| 2021/0016720 A1* | 1/2021 | Bai | F16D 11/14 |

\* cited by examiner

SWIVEL PLATFORM ASSEMBLY FOR PORTABLE ELECTRONIC DEVICE STAND

SUMMARY

In one or more aspects a swivel platform assembly for a portable electronic device stand, the swivel platform system including (I) an upper assembly including a base member couplable to the portable electronic device stand; and (II) a lower assembly including a base member rotationally coupled to the base member of the upper assembly, wherein the base member of the lower assembly is coplanar with the base member of the upper assembly along a plane, and wherein the base member of the lower assembly is rotatable with respect to the base member of the upper assembly along an axis of rotation perpendicular to the plane. Wherein the base member of the lower assembly is rotatable with respect to the base member of the upper assembly by no more than 180 degrees of rotation. Wherein the base member of the upper assembly includes an arced slot, wherein the lower assembly includes a tab perpendicularly protruding from the base member of the lower assembly, and wherein the tab of the lower assembly is coupled with the arced slot to limit extent of rotation of the base member of the lower assembly with respect to the base member of the upper assembly. Wherein the bushing includes a flange coupled with the base member of the upper assembly, wherein the base member of the lower assembly further includes a collar, and wherein the bushing includes at least one prong coupled with the collar of base member of the lower assembly. Wherein the bearing disk is positioned between the base member of the upper assembly and the base member of the lower assembly. Wherein the upper assembly includes fastener receptacles to receive fasteners for coupling with the portable electronic device stand. Wherein the base member of the upper assembly includes an aperture having a center located on the axis of rotation, and wherein the base assembly of the lower assembly includes an aperture having a center located on the axis of rotation. Wherein the lower assembly includes a collar, and wherein the bushing includes a collar coupled with the collar of the lower assembly. Wherein the collar of the lower assembly includes tabs, wherein the collar of the bushing includes slots, and wherein the tabs of the collar of the lower assembly are coupled with the slots of the collar of the bushing. Wherein the upper assembly includes at least one magnet, wherein the lower assembly includes at least one magnet, and wherein the at least one magnet of the upper assembly engages with the at least one magnet of the lower assembly in at least one rotational position of the base member of the lower assembly with respect to the base member of the upper assembly. Wherein the base member of the upper assembly has two parallel extending elongated sides and two ends perpendicularly extending with respect to the two elongated sides, and wherein the upper assembly includes at least one cover assembly extending from at least one of the two elongated sides. Wherein the base member of the upper assembly has two parallel extending elongated sides and two ends perpendicularly extending with respect to the two elongated sides, and wherein the upper assembly includes at least one cover assembly extending from one of the ends. Wherein the base member of the lower assembly has two parallel extending elongated sides, wherein the base member of the upper assembly has an end, and wherein the swivel platform system includes at least one text indicia provides an indication related to which of the two elongated sides is closest to the end at a rotational position of the base member of the upper assembly relative to the base member of the lower assembly when the end of the base member of the upper assembly is parallel with the two elongated sides of the base member of the lower assembly. Wherein the bushing includes a flange with at least one tick indicia, wherein base member of the upper assembly includes a plurality of tick indicia, wherein the at least one text indicia provides the indication based upon a predetermined alignment of the at least one tick indicia of the flange of the bushing with the at least one tick indicia of the base member of the upper assembly.

In one or more aspects a swivel platform system for a portable electronic device stand, the swivel platform system including (I) an upper assembly including a base member couplable to the device stand; (II) a lower assembly including a base member rotationally coupled to the base member of the upper assembly, wherein the base member of the lower assembly is rotatable with respect to the base member of the upper assembly along an axis of rotation; and (III) a bushing, wherein the bushing includes a flange coupled with the base member of the upper assembly, and wherein the bushing including at least one prong coupled with the base member of the lower assembly, wherein the base member of the upper assembly includes an arced slot, wherein the lower assembly includes a tab perpendicularly protruding from the base member of the lower assembly, and wherein the tab of the lower assembly is coupled with the arced slot to limit extent of rotation of the base member of the lower assembly with respect to the base member of the upper assembly. Wherein the upper assembly includes at least one magnet, wherein the lower assembly includes at least one magnet, and wherein the at least magnet of the upper assembly engages with the at least one magnet of the lower assembly in at least one rotational position of the base member of the lower assembly with respect to the base member of the upper assembly. Wherein the base member of the upper assembly includes an aperture having a center located on the axis of rotation, and wherein the base assembly of the lower assembly includes an aperture having a center located on the axis of rotation.

In one or more aspects a swivel platform system for a portable electronic device stand, the swivel platform system including a swivel platform assembly including: (I) an upper assembly including a base member couplable to the device stand; (II) a lower assembly including a base member rotationally coupled to the base member of the upper assembly, wherein the base member of the lower assembly is coplanar with the base member of the upper assembly along a plane, and the base member of the lower assembly is rotatable with respect to the base member of the upper assembly along an axis of rotation perpendicular to the plane; and a device stand including (I) a lower assembly, (II) a wall assembly coupled to the base, and (III) a portable electronic device support assembly coupled to the wall assembly, wherein the lower assembly of the device stand is coupled to the upper assembly of the swivel platform assembly. Wherein the base member of the lower assembly has two parallel extending elongated sides, wherein the base member of the upper assembly has an end, and wherein the swivel platform system includes at least one text indicia providing an indication related to which of the two elongated sides is closest to the end at a rotational position of the base member of the upper assembly relative to the base member of the lower assembly when the end of the base member of the upper assembly is parallel with the two elongated sides of the base member of the lower assembly. Wherein the bushing includes a flange with at least one tick indicia, wherein base member of the upper assembly includes a plurality of tick indicia, wherein the at least one text indicia provides the indication based upon a predetermined alignment of the at least one tick indicia of the flange of the bushing with the at least one tick indicia of the base member of the upper assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Swivel Platform Assembly for Portable Electronic Device Stand, articles of manufacture, compositions of matter for same that may provide context, for instance, in introducing one or more processes and/or devices described herein.

DETAILED DESCRIPTION

Figure 1:
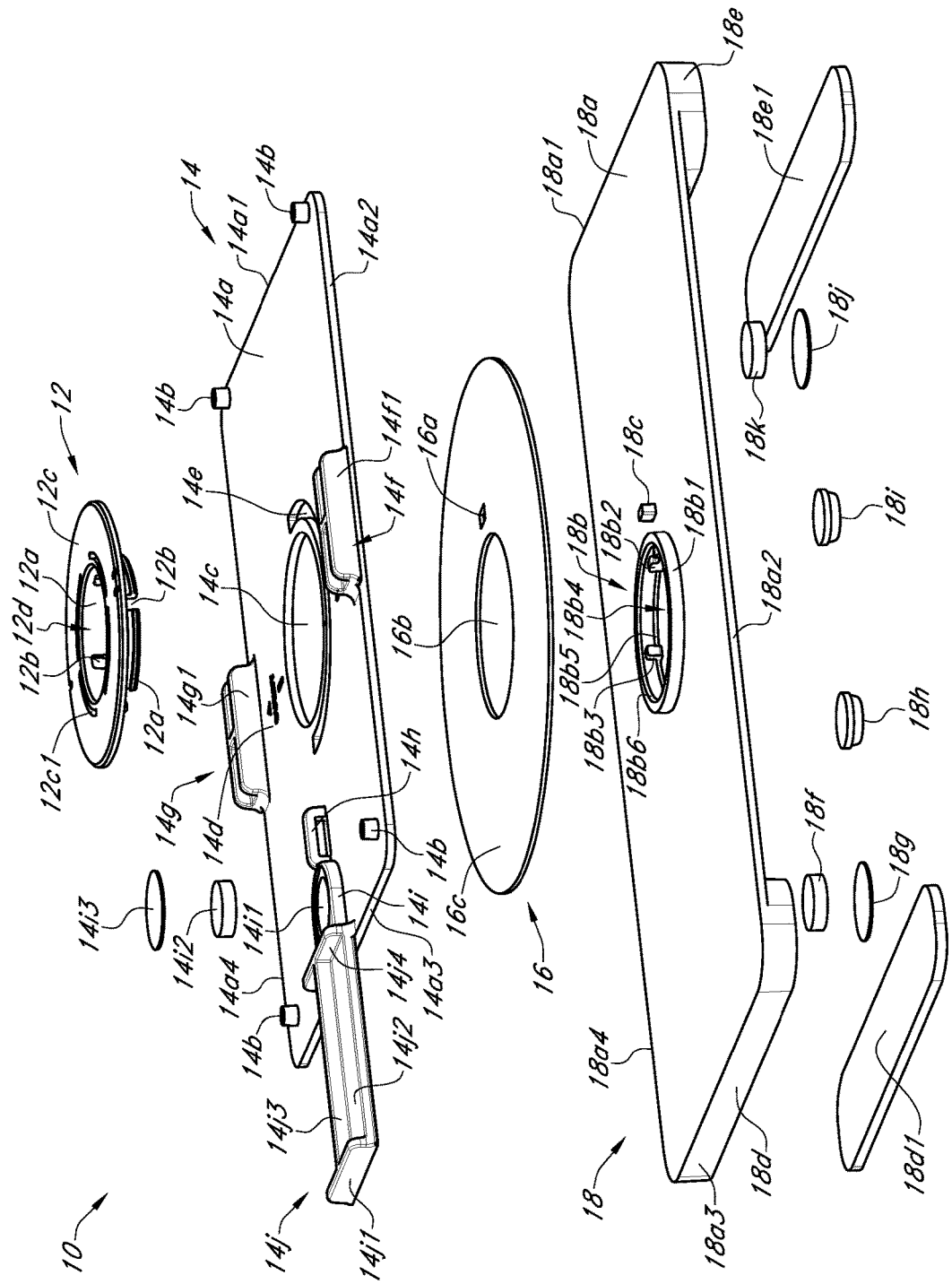
FIG. 1 is an exploded side-top perspective view of a swivel platform assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded side-top perspective of swivel platform assembly 10. Depicted implementation of swivel platform assembly 10 is shown to include bushing assembly 12, upper assembly 14, bearing disk 16, and lower assembly 18. Depicted implementation of bushing assembly 12 is shown to include collar portion 12a, notch portion 12b, flange portion 12c with slot 12c1, and central aperture 12d.

Depicted implementation of upper assembly 14 is shown to include base member 14a with end 14a1, elongated side 14a2, end 14a3, and elongated side 14a4, fastener receptacle 14b, central aperture 14c, text indicia 14d, arced slot 14e, cover assembly 14f with exterior wall 14f1, and cover assembly 14g with interior wall 14g1, protrusion 14h, receptacle member 14i with opening 14i1, magnetic member 14i2, and cover 14i3, cover assembly 14j with exterior wall 14j1, base portion 14j2, support member 14j3, and interior wall 14j4. Depicted implementation of bearing disk 16 is shown to include positioning aperture 16a, central aperture 16b, and upper surface 16c.

Depicted implementation of lower assembly 18 is shown to include base member 18a with end 18a1, elongated side 18a2, end 18a3, and elongated side 18a4, positioner member 18b with collar portion 18b1, tab portion 18b2, tab portion 18b3, central aperture 18b4, circular notch 18b5, and circular bevel 18b6, tab portion 18c, support portion 18d with foot pad 18d1, support portion 18e with foot pad 18e1, magnetic member 18f, cover member 18g, foot pad 18h, foot pad 18i, magnetic member 18j, and cover member 18k. As depicted, base member 14a of upper assembly 14 is shown to be coplanar with base member 18a of lower assembly 18 along a plane. As will be shown below FIG. 9, base member 14a of upper assembly 14 is rotatable with respect to base member 18a of lower assembly 18 along an axis of rotation perpendicular to the plane that is limited to 180 degrees in which magnetic member 14i2 magnetically engages with magnetic member 18f or magnetic member 18j at each end of rotational travel.

Figure 2:
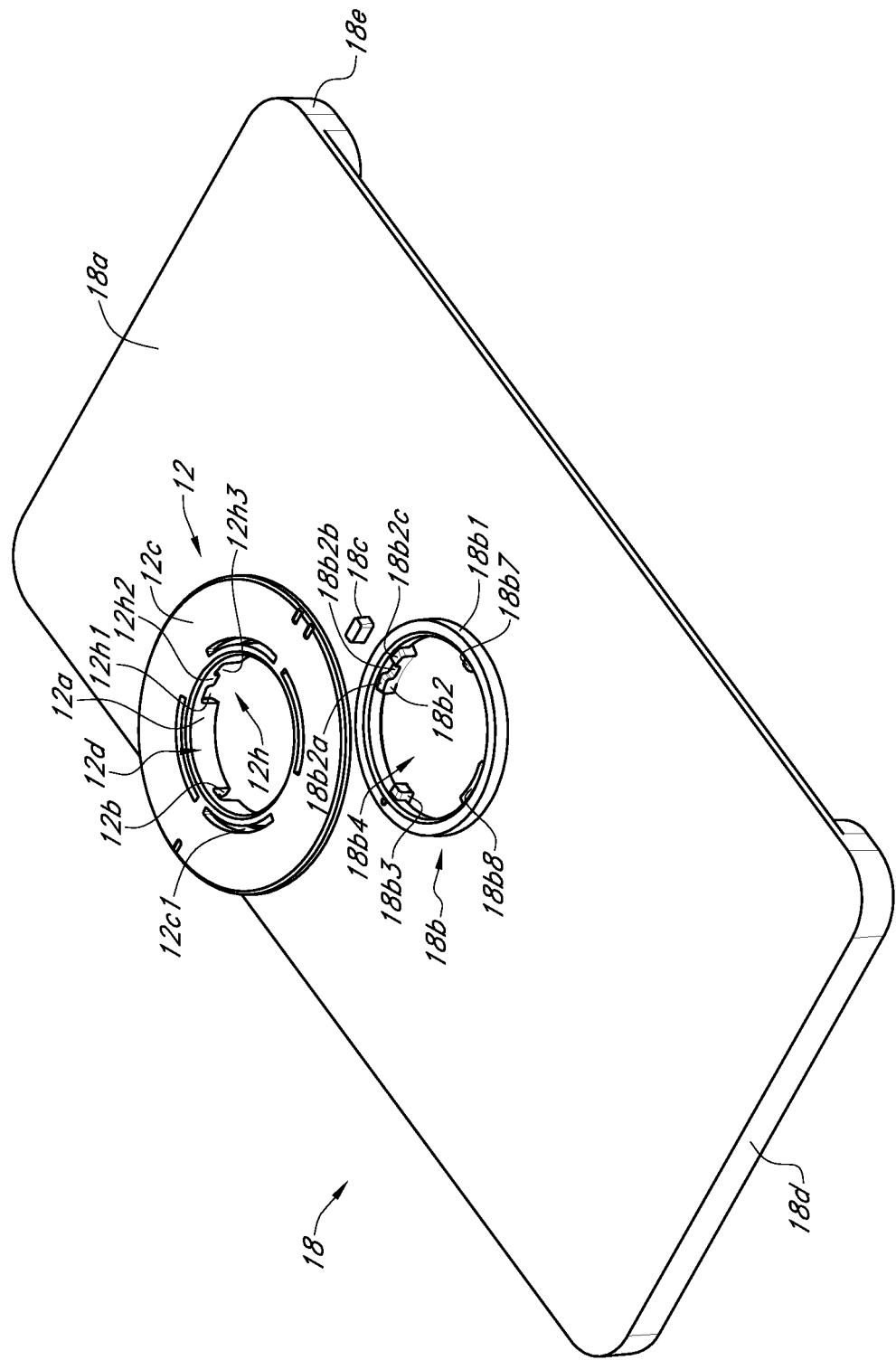
FIG. 2 is an exploded top perspective partial view of the swivel platform assembly of FIG. 1.

Turning to FIG. 2, depicted therein is an exploded top perspective partial view of swivel platform assembly 10. Depicted implementation of bushing assembly 12 is shown to include collar key portion 12h with notch portion 12h1, tab portion 12h2, and notch portion 12h3.

Depicted implementation of lower assembly 18 with positioner member 18b with tab portion 18b2 to include tab portion 18b2a, notch portion 18b2b, and tab portion 18b2c. Depicted implementation of positioner member 18b is shown to include tab portion 18b7 and tab portion 18b8.

Figure 3:
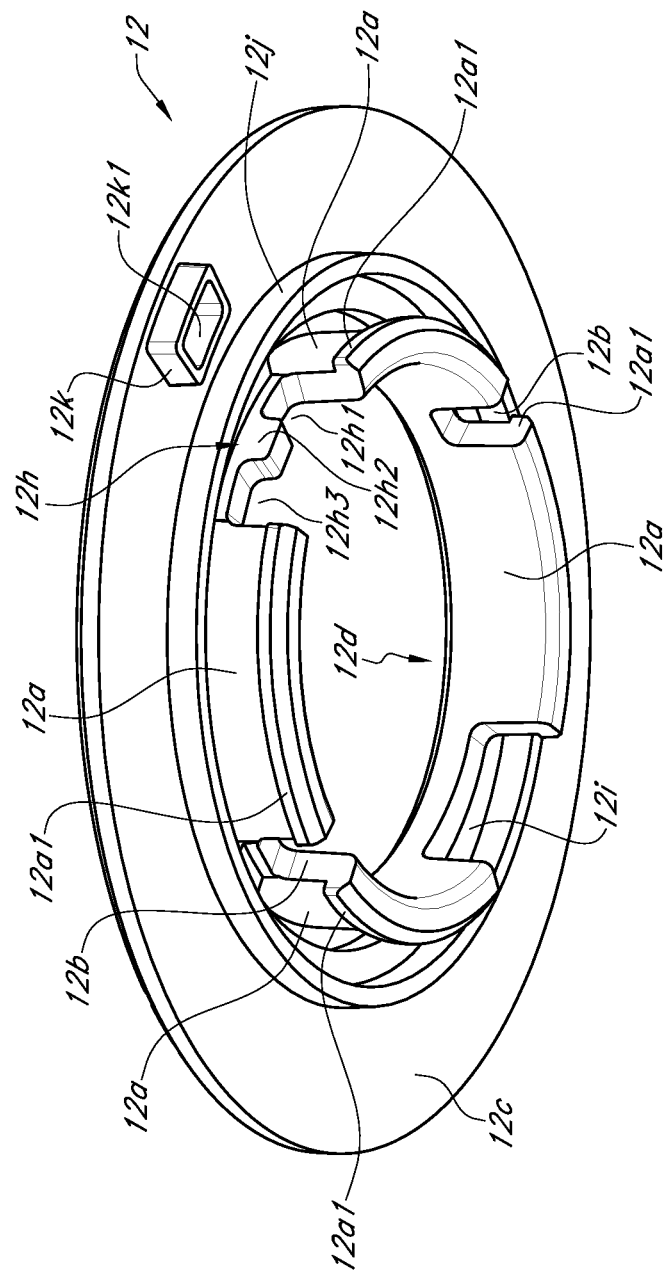
FIG. 3 is a bottom perspective view of the bushing of the swivel platform assembly of FIG. 1.

Turning to FIG. 3, depicted therein is a bottom perspective view of swivel platform assembly 10. Depicted implementation of bushing assembly 12 is shown to include collar portion 12a with prong portion 12a1, notch portion 12i, circular ring 12j, and socket 12k with opening 12k1.

Figure 4:
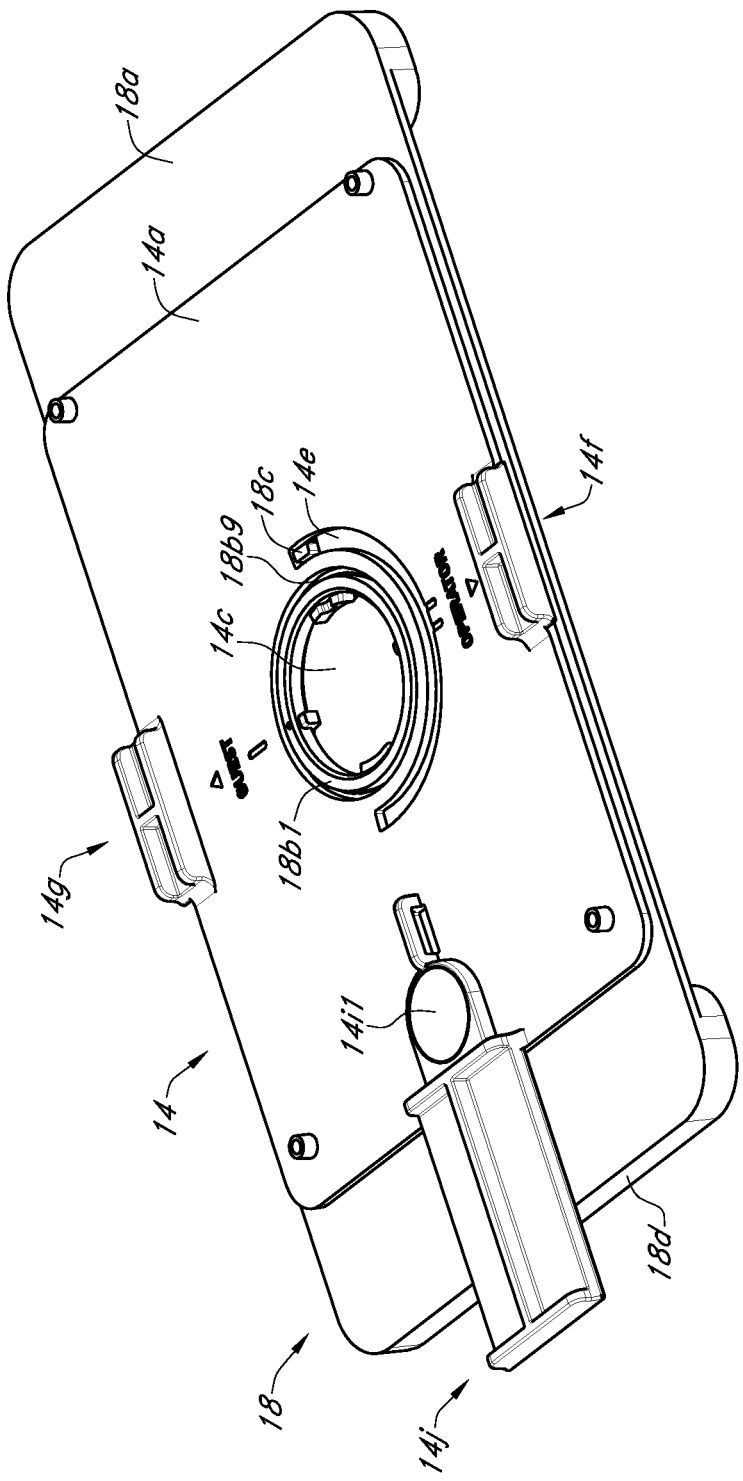
FIG. 4 is a top perspective partial view of the swivel platform assembly of FIG. 1.

Turning to FIG. 4, depicted therein is a top perspective partial view of swivel platform assembly 10. Depicted implementation of lower assembly 18 is shown to include positioner member 18b with circular gap 18b9. As depicted tab portion 18c is positioned in arced slot 14e to limit to 180 degrees the amount of rotation of base member 14a with respect to base member 18a.

Figure 5:
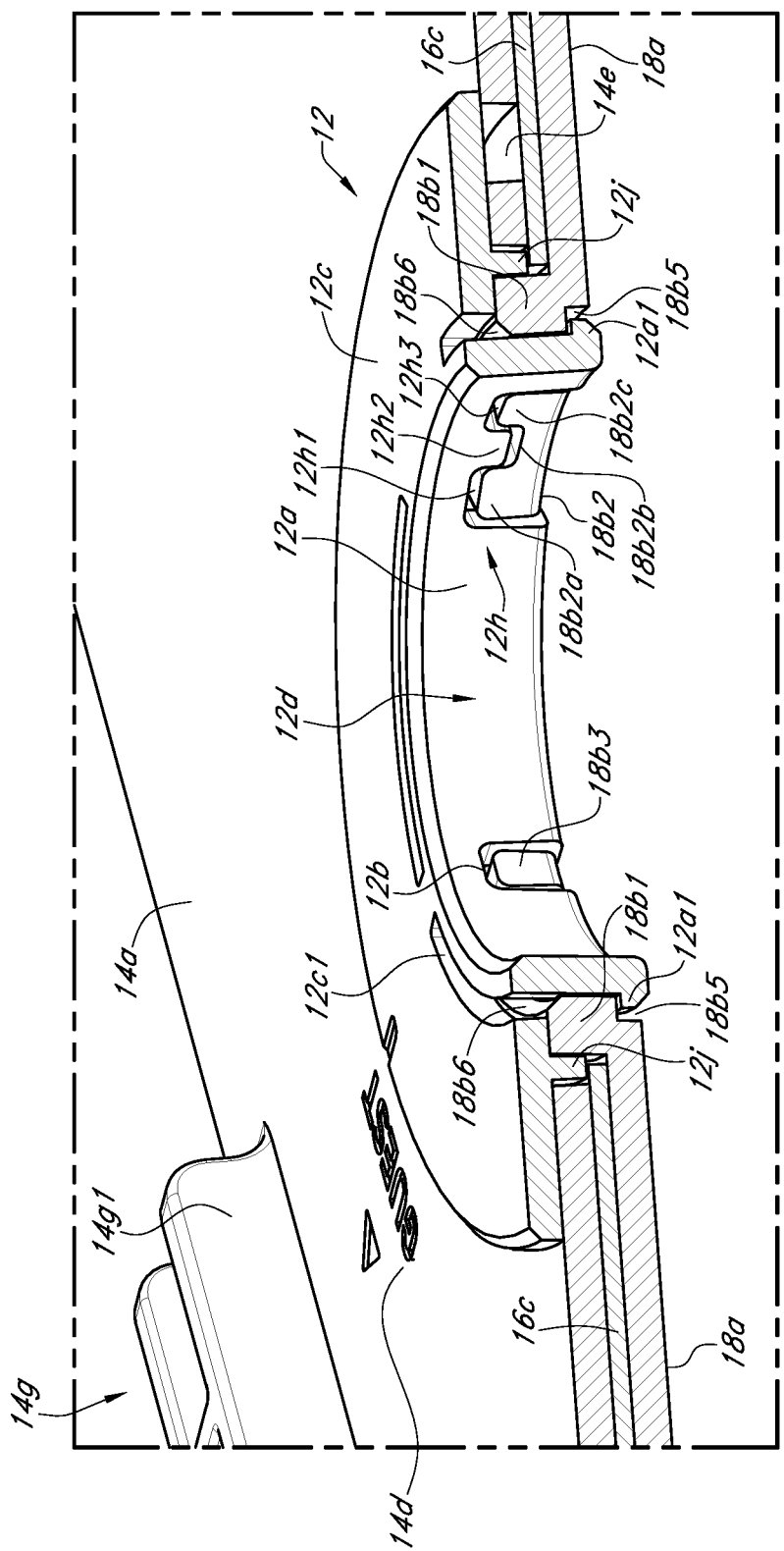
FIG. 5 is a top perspective cross-sectional partial view of the swivel platform assembly of FIG. 1.

Turning to FIG. 5, depicted therein is a top perspective cross-sectional view of swivel platform assembly 10.

Figure 6:
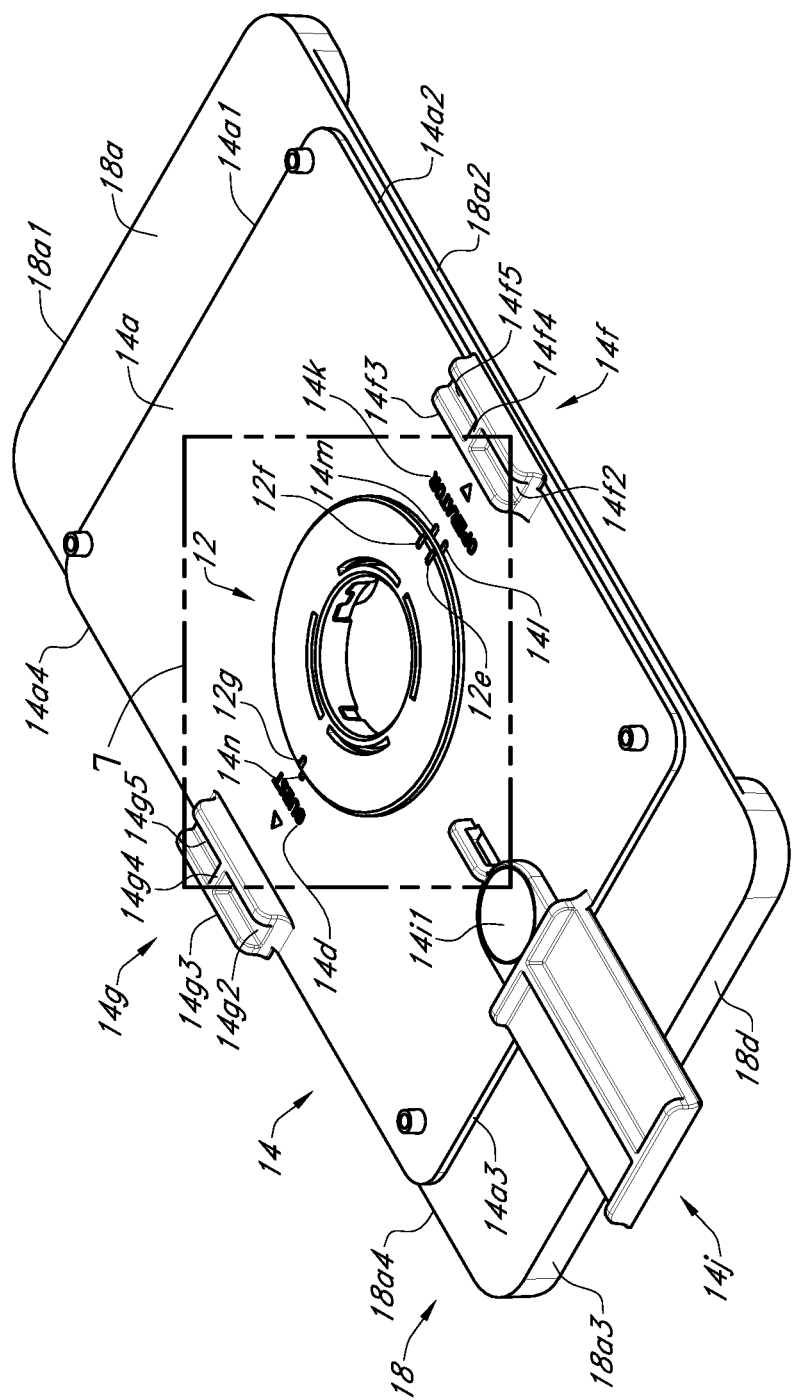
FIG. 6 is a top perspective view of the swivel platform assembly of FIG. 1.

Turning to FIG. 6, depicted therein is a top perspective view of swivel platform assembly 10. Depicted implementation of bushing assembly 12 is shown to include tick indicia 12e, tick indicia 12f, and tick indicia 12g.

Depicted implementation of cover assembly 14f is shown to include base portion 14f2, interior wall 14f3, support member 14f4, and base portion 14f5. Depicted implementation of cover assembly 14g is shown to include base portion 14g2, exterior wall 14g3, support member 14g4, and base portion 14g5. Depicted implementation of upper assembly 14 is shown to include text indicia 14k, tick indicia 14l, tick indicia 14m, and tick indicia 14n.

Figure 9:
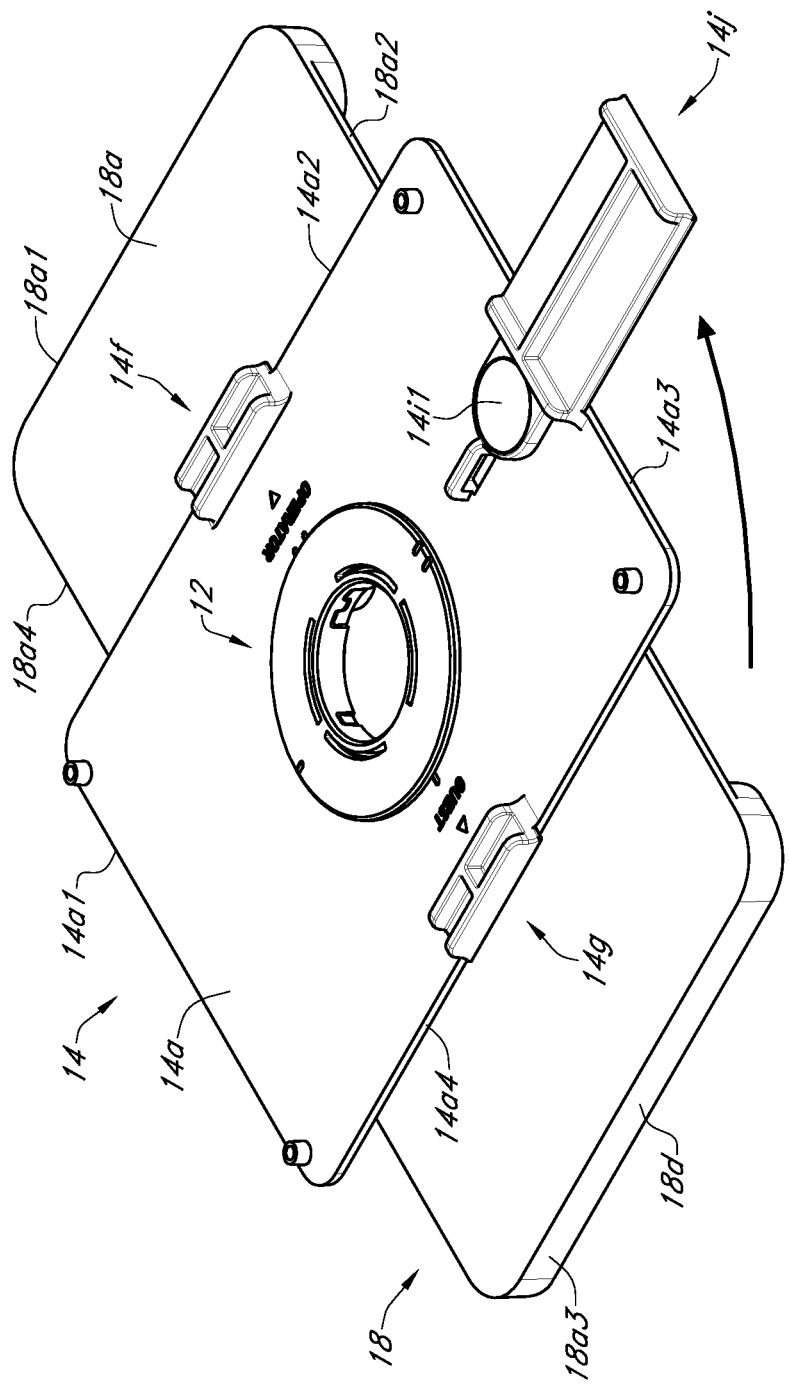
FIG. 9 is a perspective view of a first portion of the swivel platform assembly rotationally positioned with respect to a second portion of the swivel platform assembly of FIG. 1.

When tick indicia 14l, tick indicia 14m, and tick indicia 14n are aligned with tick indicia 12e, tick indicia 12f, and tick indicia 12g, respectively, (better shown in FIG. 7) then text indicia 14d and text indicia 14k can be used to indicate that base member 14a will rotate counterclockwise with respect to base member 18a and to indicate that at the mid-position of the rotation (such as shown in FIG. 9) elongated side 14a2, end 14a1, elongated side 14a4, and end 14a3, will be parallel with and closest to end 18a1, elongated side 18a4, end 18a3, and elongated side 18a2, respectively. Then at the final position of the rotation end 14a1, elongated side 14a2, end 14a3, and elongated side 14a4 will be parallel with and closest to end 18a3, elongated side 18a4, elongated side 18a2, and end 18a1, respectively.

Figure 7:
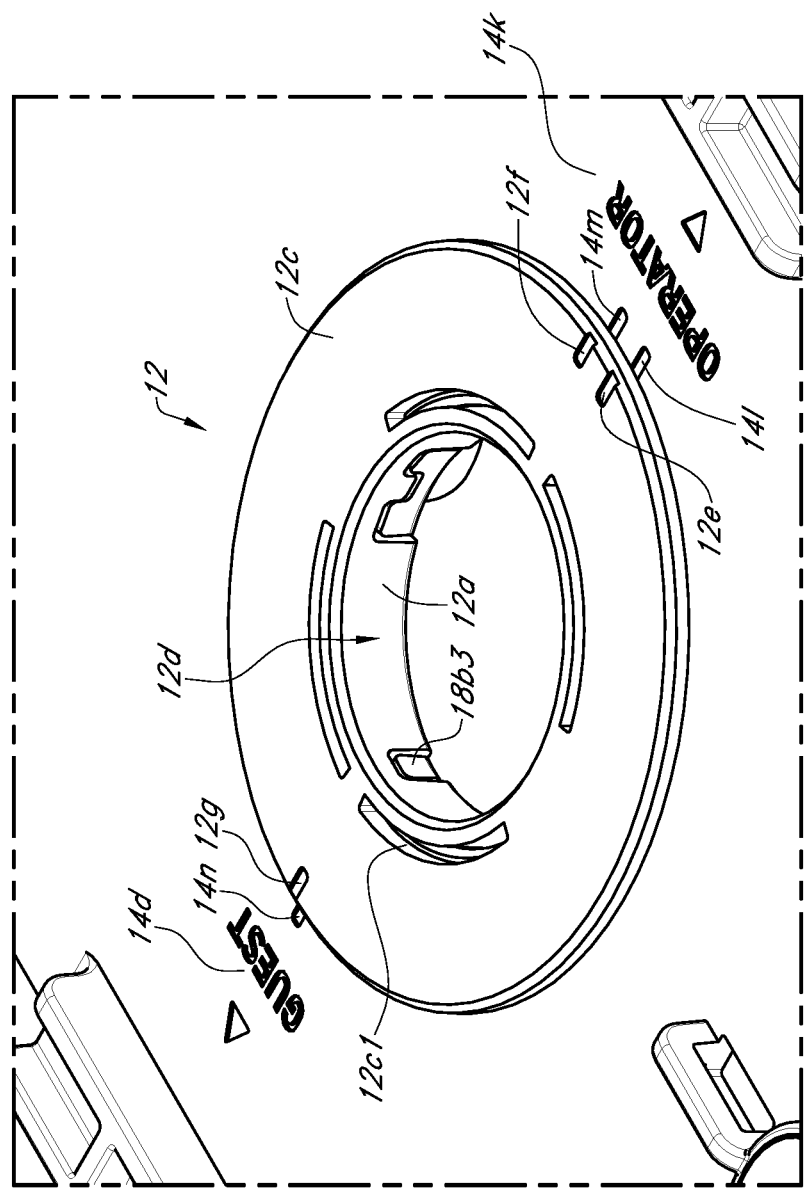
FIG. 7 is a top perspective view of an enlarged portion of the swivel platform assembly of FIG. 1.

Turning to FIG. 7, depicted therein is a top perspective view of an enlarged portion of swivel platform assembly 10.

Figure 8:
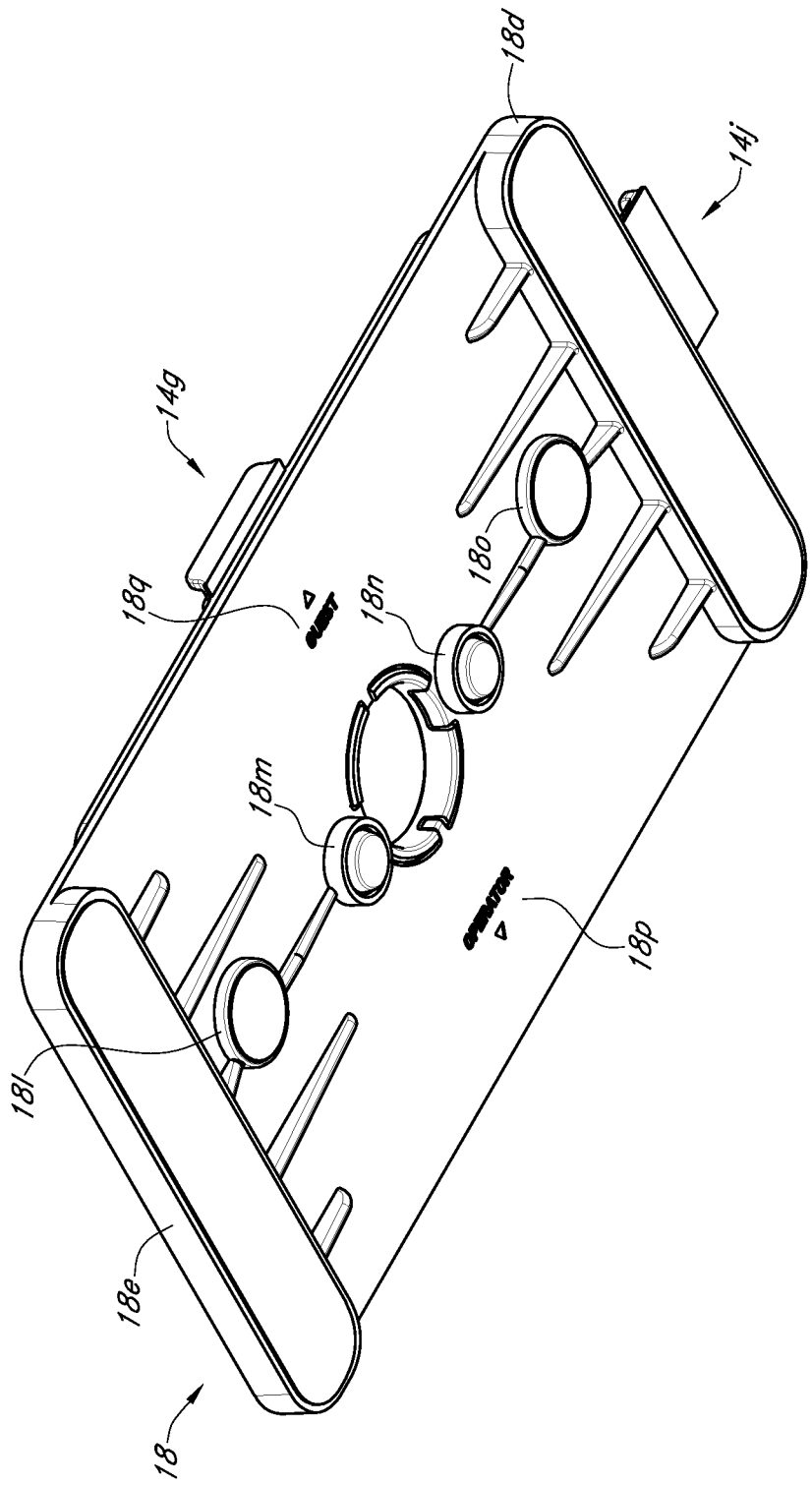
FIG. 8 is a bottom perspective view of the swivel platform assembly of FIG. 1.

Turning to FIG. 8, depicted therein is a bottom perspective view of swivel platform assembly 10. Depicted implementation of lower assembly 18 is shown to include receptacle member 18l, receptacle member 18m, receptacle member 18n, receptacle member 18o, text indicia 18p, and text indicia 18q.

Turning to FIG. 9, depicted therein is a perspective view of upper assembly 14 rotationally positioned with respect to lower assembly 18.

Figure 10:
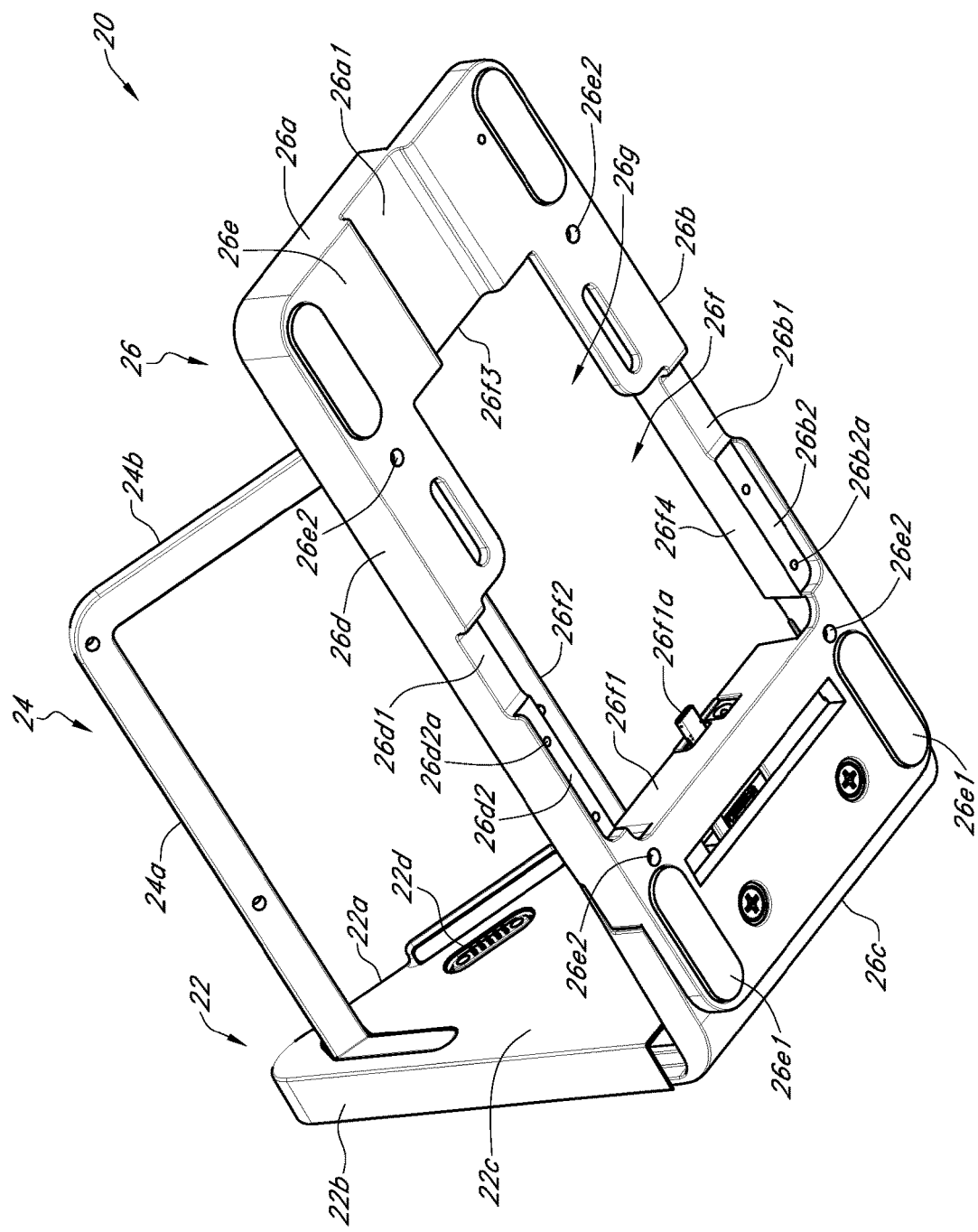
FIG. 10 is a bottom perspective partial view of a stand assembly.

Turning to FIG. 10, depicted therein is a bottom perspective partial view of portable electronic device stand 20. Depicted implementation of portable electronic device stand 20 is shown to include wall assembly 22, portable electronic device support assembly 24, and lower assembly 26. Depicted implementation of wall assembly 22 is shown to include side 22a, side 22b, exterior face 22c, and electronic device interface port 22d (for coupling with electrical power and/or electronic communication of a portable electronic device or its accessory implementations such as coupled through pogo pin contact implementations of electronic device interface port 22d).

Depicted implementation of portable electronic device support assembly 24 includes side 24a, and crosspiece 24b. Depicted implementation of lower assembly 26 includes exterior end 26a with passageway 26a1, exterior side 26b with passageway 26b1 and recess 26b2 with aperture 26b2a (threaded in implementations), and exterior end 26c. Depicted implementation of lower assembly 26 includes exterior side 26d with passageway 26d1, and recess 26d2 with aperture 26d2a (threaded in some implementations), and exterior bottom surface 26e with foot pad 26e1 andaperture 26e2 (threaded in some implementations).

Depicted implementation of lower assembly 26 includes interior cavity 26f with interior end 26f1, electronic interface port 26f1a, interior side 26f2, interior end 26f3, and interior side 26f4. Depicted implementation of lower assembly 26 is shown to include lower opening 26g. Although not shown, in implementations electronic interface port 26f1a is coupled to electronic device interface port 22d via electrical cabling being internally position within interiors of wall assembly 22 and lower assembly 26.

Figure 11:
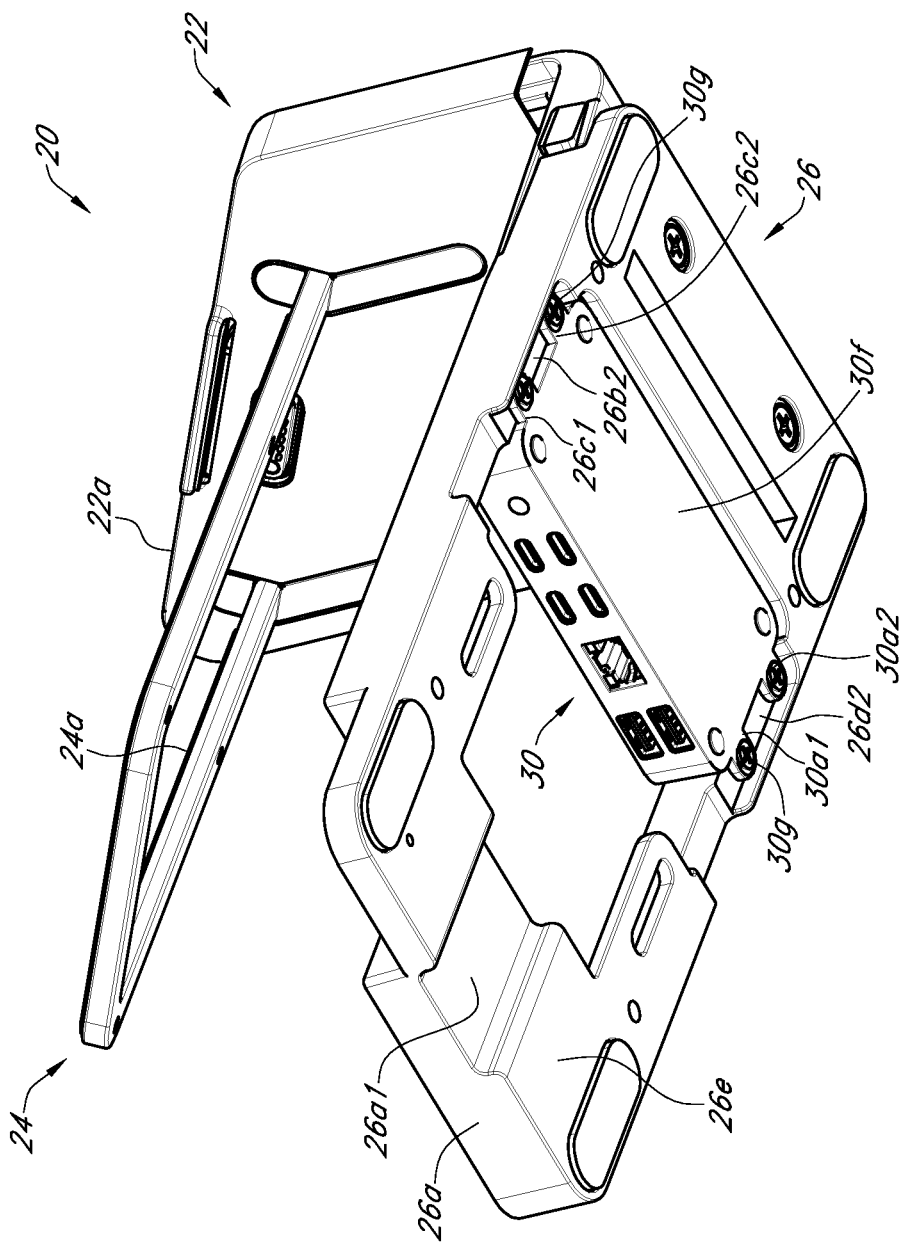
FIG. 11 is a bottom perspective view of a hub device coupled with the stand assembly of FIG. 10 shown as a bottom perspective partial view of the stand assembly.

Turning to FIG. 11, depicted therein is a bottom perspective view of electronic hub device 30 coupled with portable electronic device stand 20 shown as a front-bottom perspective partial view of portable electronic device stand 20. As depicted electronic hub device 30 is shown to include protrusion 30a1, protrusion 30a2, exterior surface portion 30f and fastener 30g. As depicted protrusion 30a1 and protrusion 30a2 are shown positioned in recess 26d2 with fastener 30g coupled with aperture 26d2a.

Figure 12:
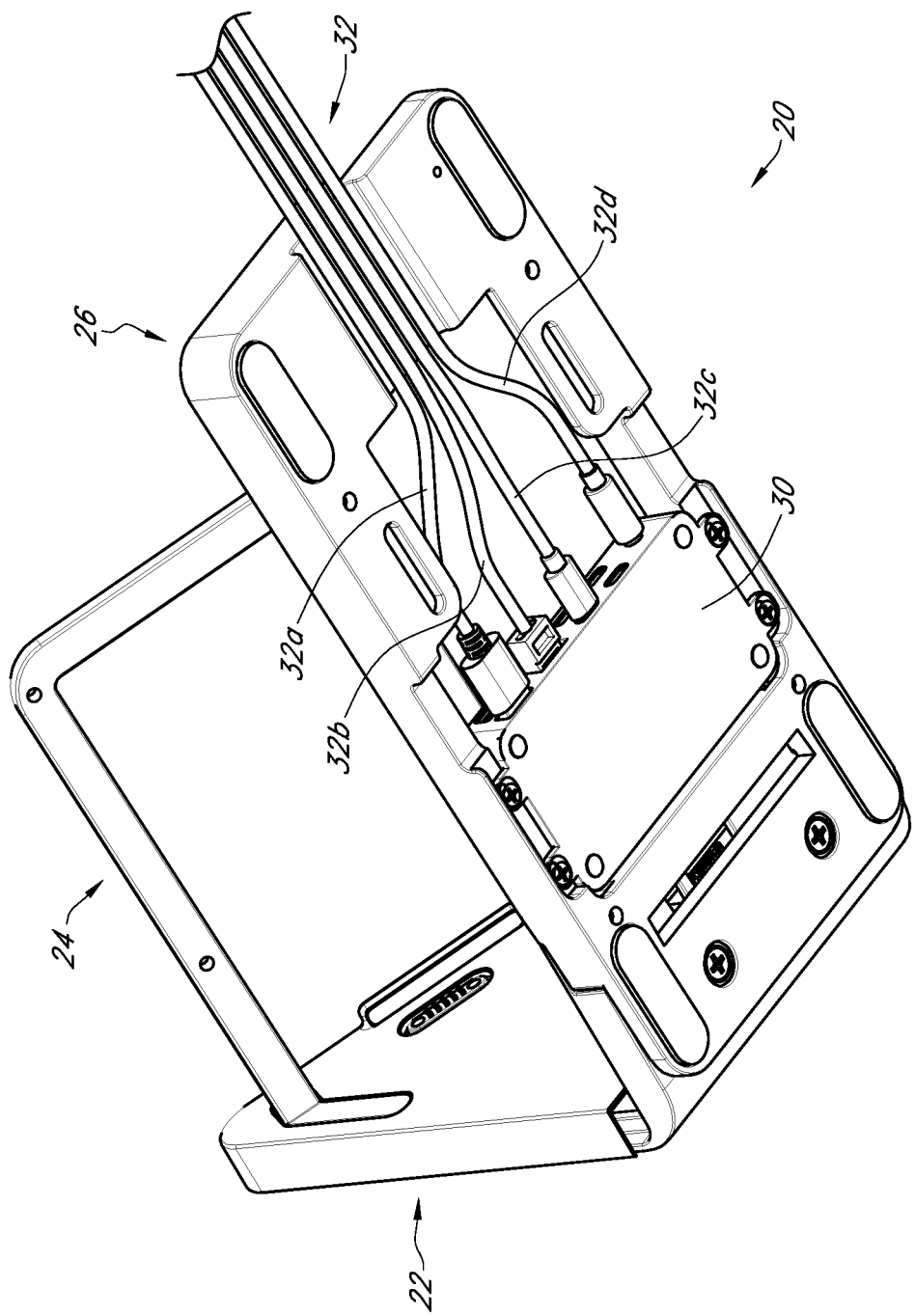
FIG. 12 is a bottom perspective view of the hub device of FIG. 11 coupled with the stand assembly of FIG. 10 shown as a bottom perspective partial view of the stand assembly.

Turning to FIG. 12, depicted therein is a bottom perspective view of electronic hub device 30 coupled with portable electronic device stand 20 shown as a front-bottom perspective partial view of portable electronic device stand 20. Depicted implementation of electronic hub device 30 is shown to include usb cable 32a, ethernet cable 32b, usb-c cable 32c, and electrical power cable 32d.

Figure 13:
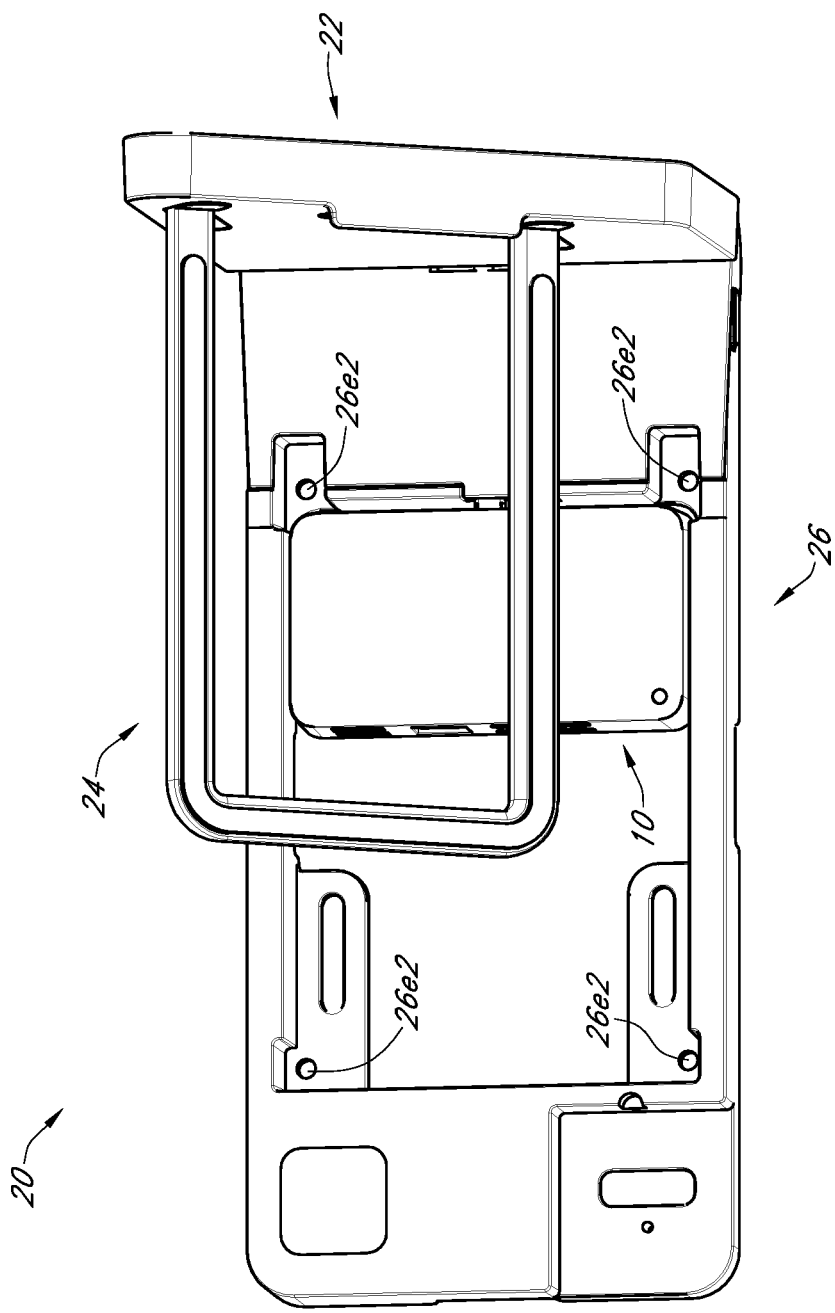
FIG. 13 is a top-plan partial view of the stand assembly of FIG. 10 coupled with the hub device of FIG. 11.

FIG. 13 is a top-plan partial view of portable electronic device stand 20 coupled with electronic hub device 30.

Figure 14:
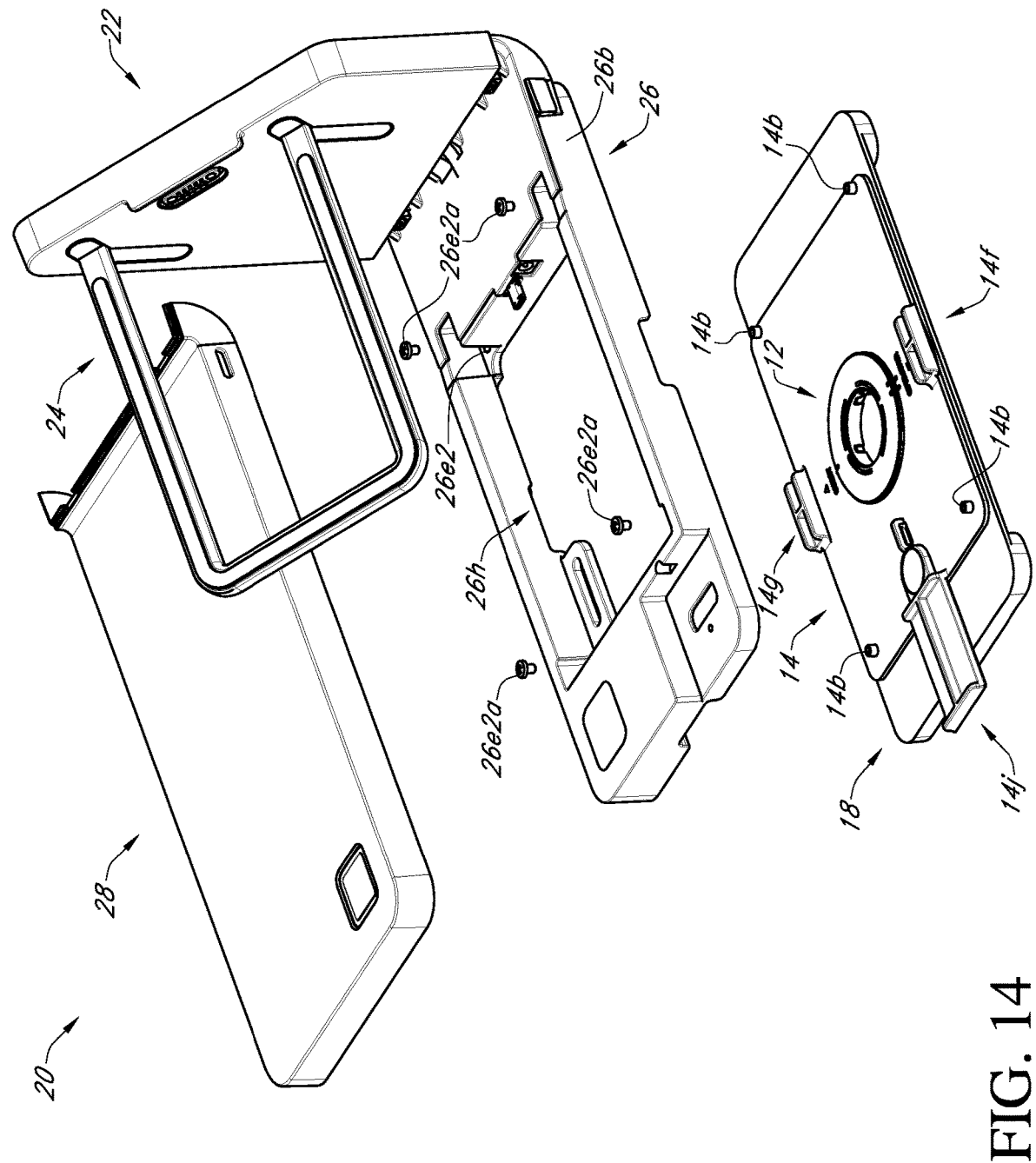
FIG. 14 is a top perspective exploded view of the stand assembly of FIG. 10 and the swivel platform assembly of FIG. 1.

Turning to FIG. 14, depicted therein is a top perspective exploded view of portable electronic device stand 20 and swivel platform assembly 10. Depicted implementation of portable electronic device stand 20 is shown to include upper assembly 28. Depicted implementation of lower assembly 26 is shown to include fastener 26e2a.

Figure 15:
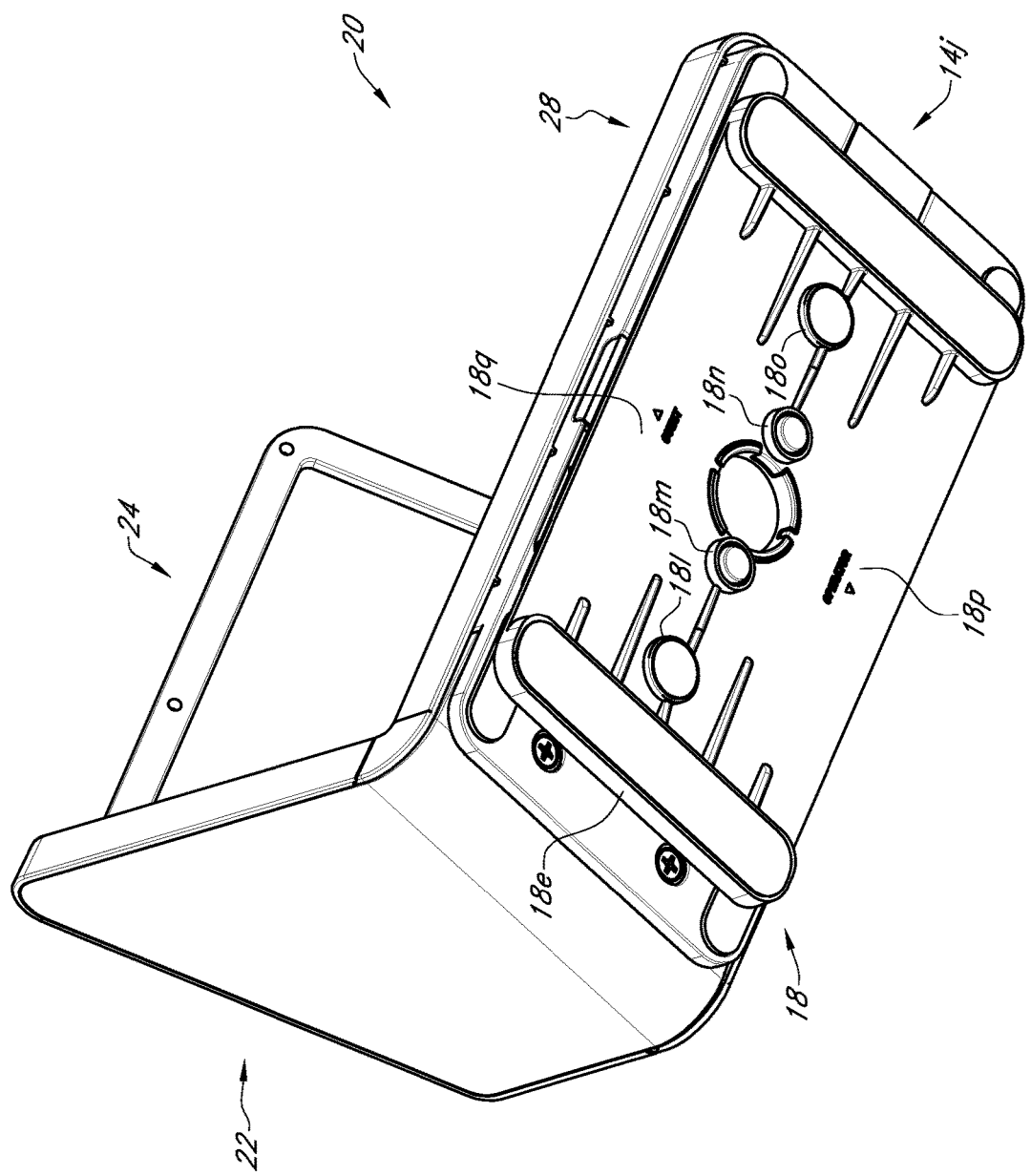
FIG. 15 is a bottom perspective view of the swivel platform assembly of FIG. 1 coupled with the stand assembly of FIG. 10.

Turning to FIG. 15, depicted therein is a bottom perspective view of swivel platform assembly 10 coupled with portable electronic device stand 20.

Figure 16:
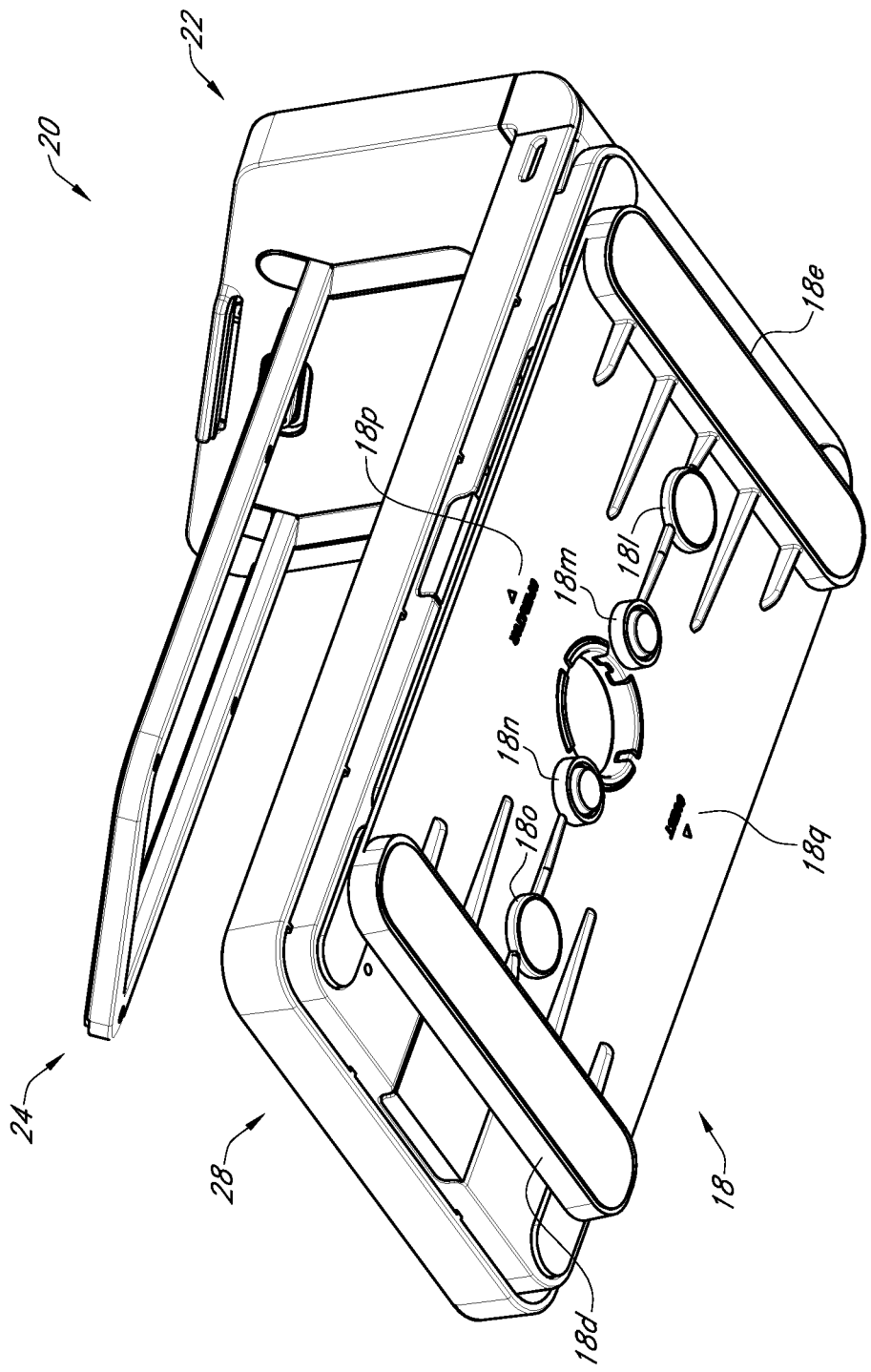
FIG. 16 is a bottom perspective view of the swivel platform assembly of FIG. 1 coupled with the stand assembly of FIG. 10.

Turning to FIG. 16, depicted therein is a bottom perspective view of swivel platform assembly 10 coupled with portable electronic device stand 20.

Figure 17:
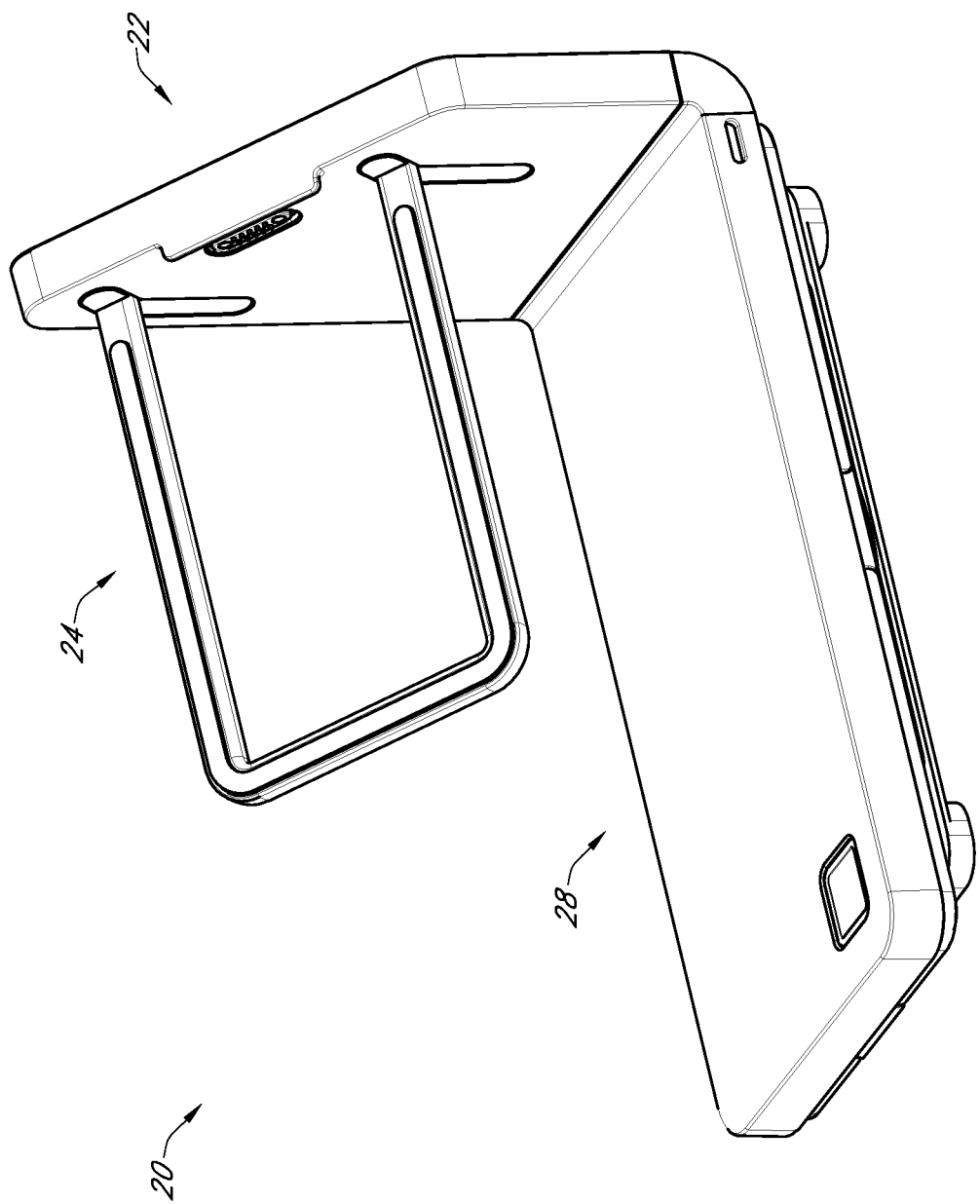
FIG. 17 is a top perspective view of the swivel platform assembly of FIG. 1 coupled with the stand assembly of FIG. 10.

Turning to FIG. 17, depicted therein is a top perspective view of swivel platform assembly 10 coupled with portable electronic device stand 20.

Figure 18:
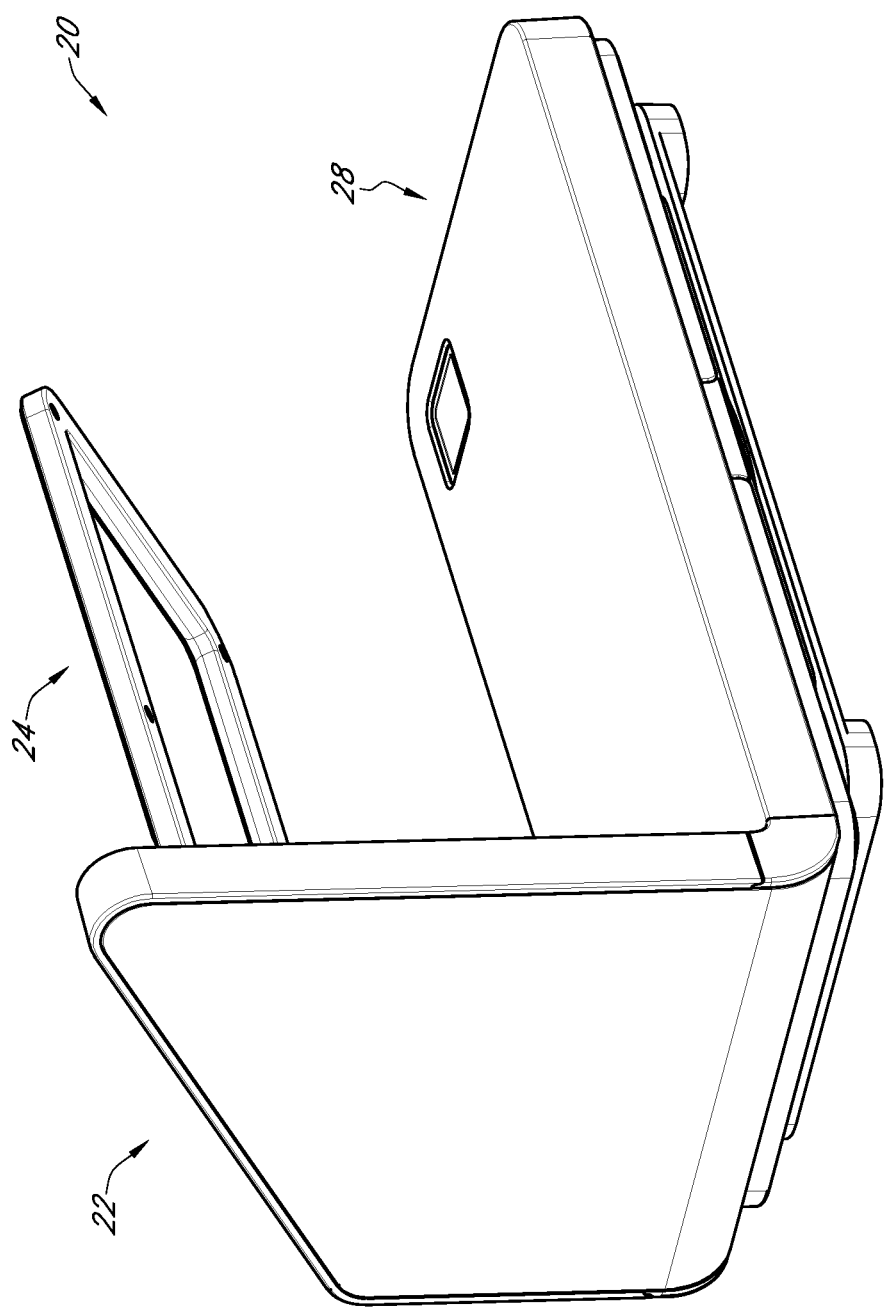
FIG. 18 is a top perspective view of the swivel platform assembly of FIG. 1 coupled with the stand assembly of FIG. 10.

Turning to FIG. 18, depicted therein is a top perspective view of swivel platform assembly 10 coupled with portable electronic device stand 20.

Figure 19:
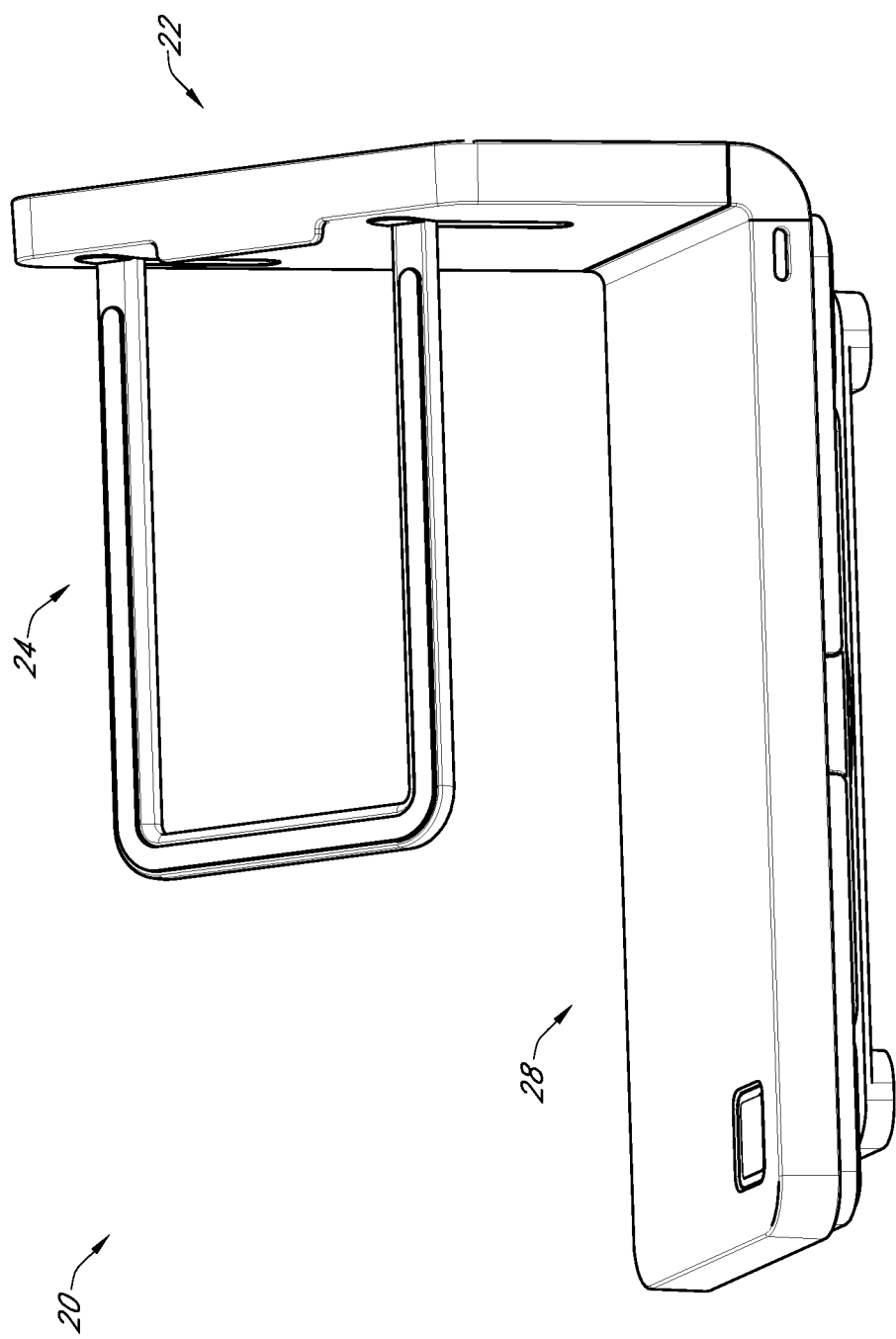
FIG. 19 is a side-top perspective view of the swivel platform assembly of FIG. 1 coupled with the stand assembly of FIG. 10.

Turning to FIG. 19, depicted therein is a side-top perspective view of swivel platform assembly 10 coupled with portable electronic device stand 20.

Figure 20:
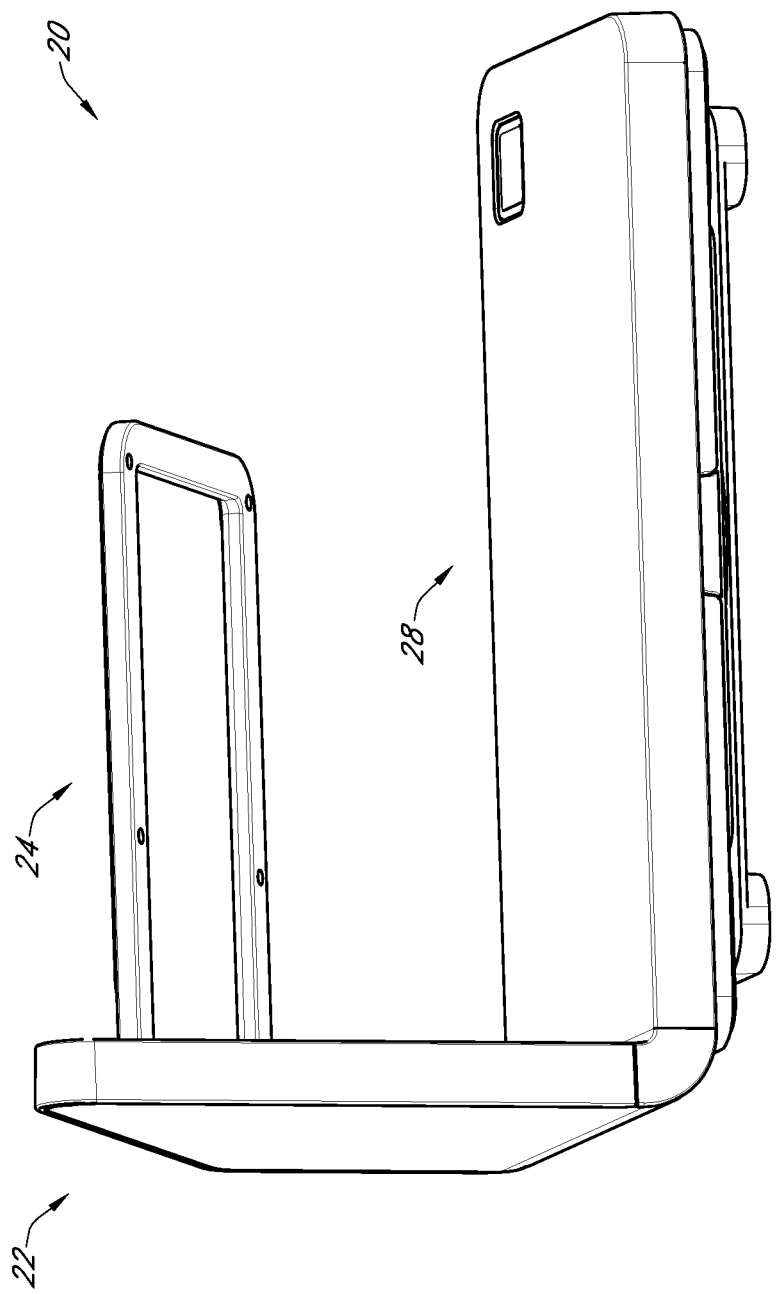
FIG. 20 is a side-top perspective view of the swivel platform assembly of FIG. 1 coupled with the stand assembly of FIG. 10.

Turning to FIG. 20, depicted therein is a side-top perspective view of swivel platform assembly 10 coupled with portable electronic device stand 20.

Figure 21:
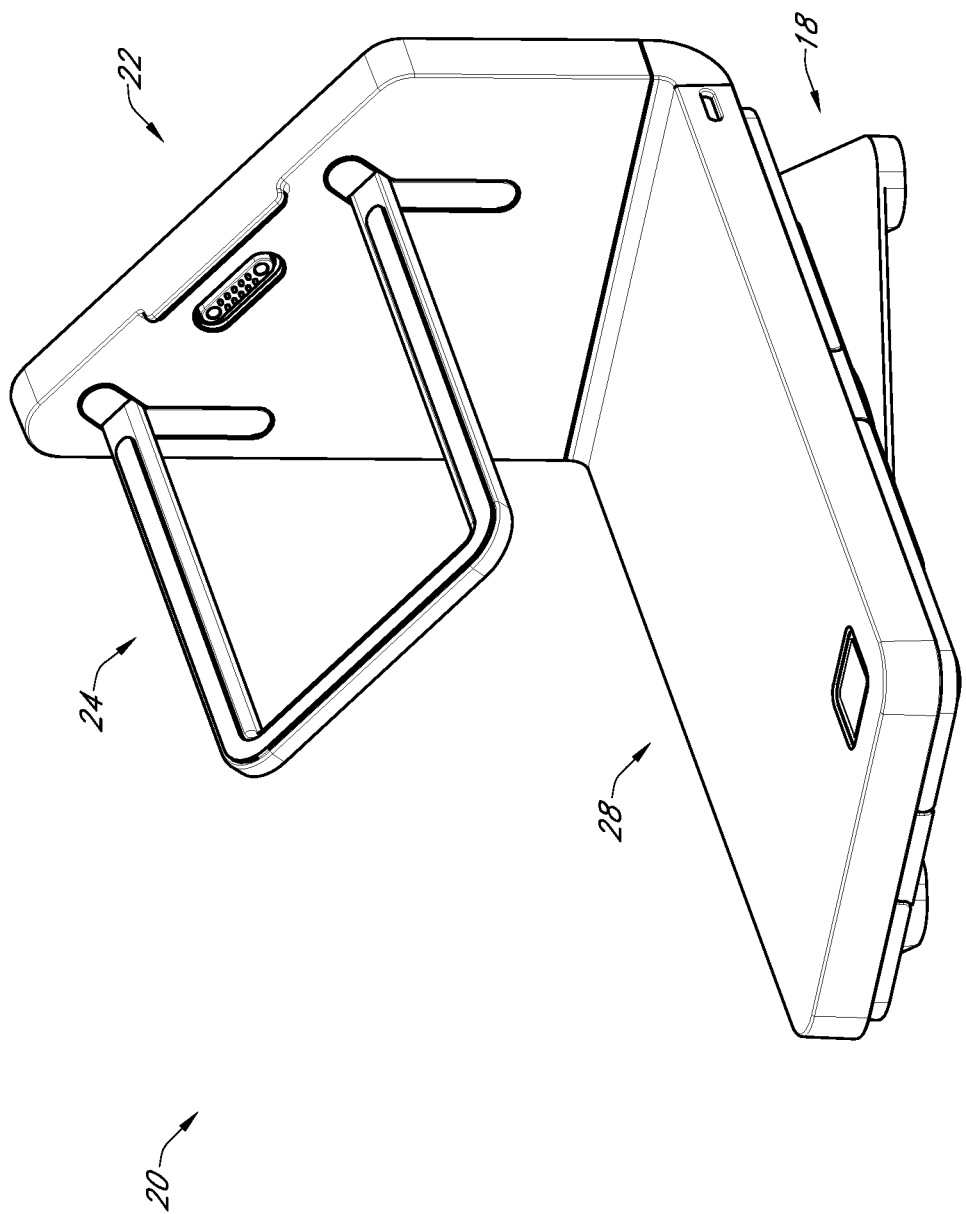
FIG. 21 is a top perspective view of the swivel platform assembly of FIG. 1 in a swiveled position coupled with the stand assembly of FIG. 10.

Turning to FIG. 21, depicted therein is a top perspective view of swivel platform assembly 10 in a swiveled position coupled with portable electronic device stand 20.

Figure 22:
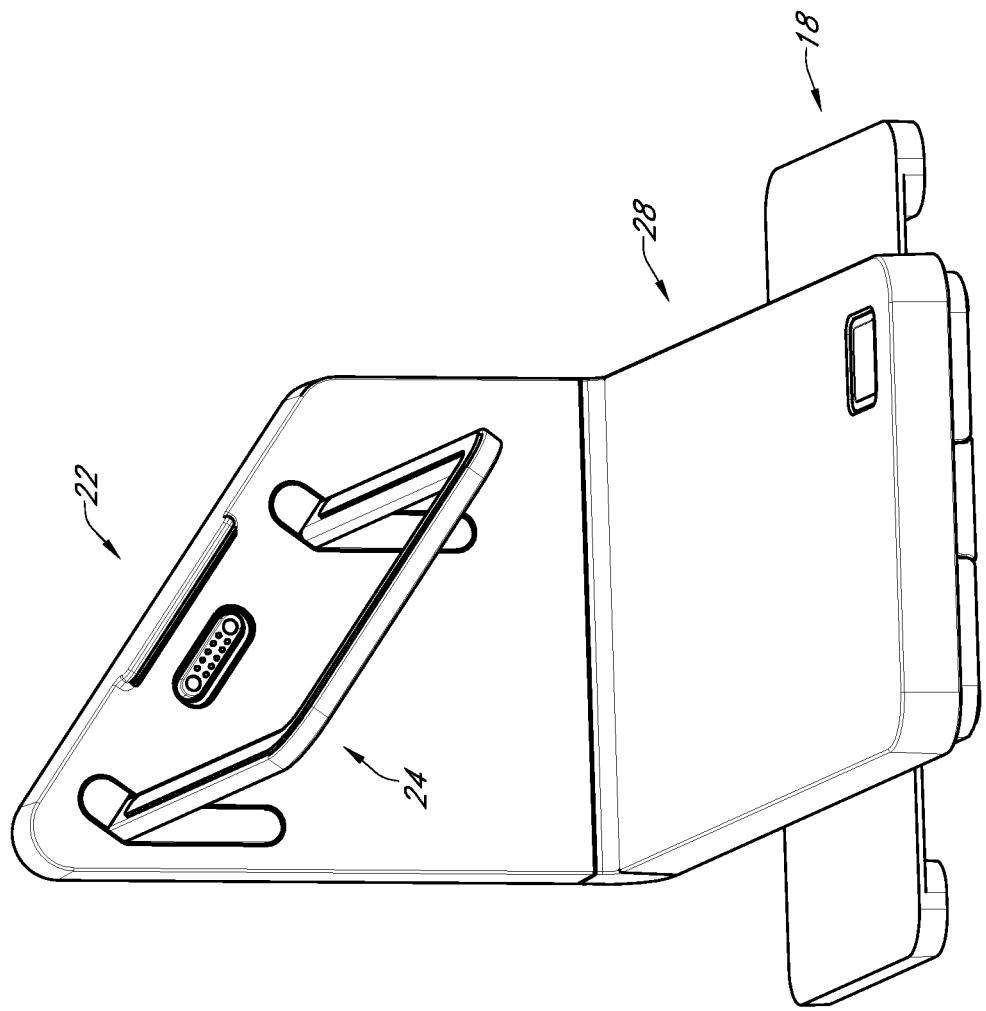
FIG. 22 is a top perspective view of the swivel platform assembly of FIG. 1 in a swiveled position coupled with the stand assembly of FIG. 10.

Turning to FIG. 22, depicted therein is a top perspective view of swivel platform assembly 10 in a swiveled position coupled with portable electronic device stand 20.

Figure 23:
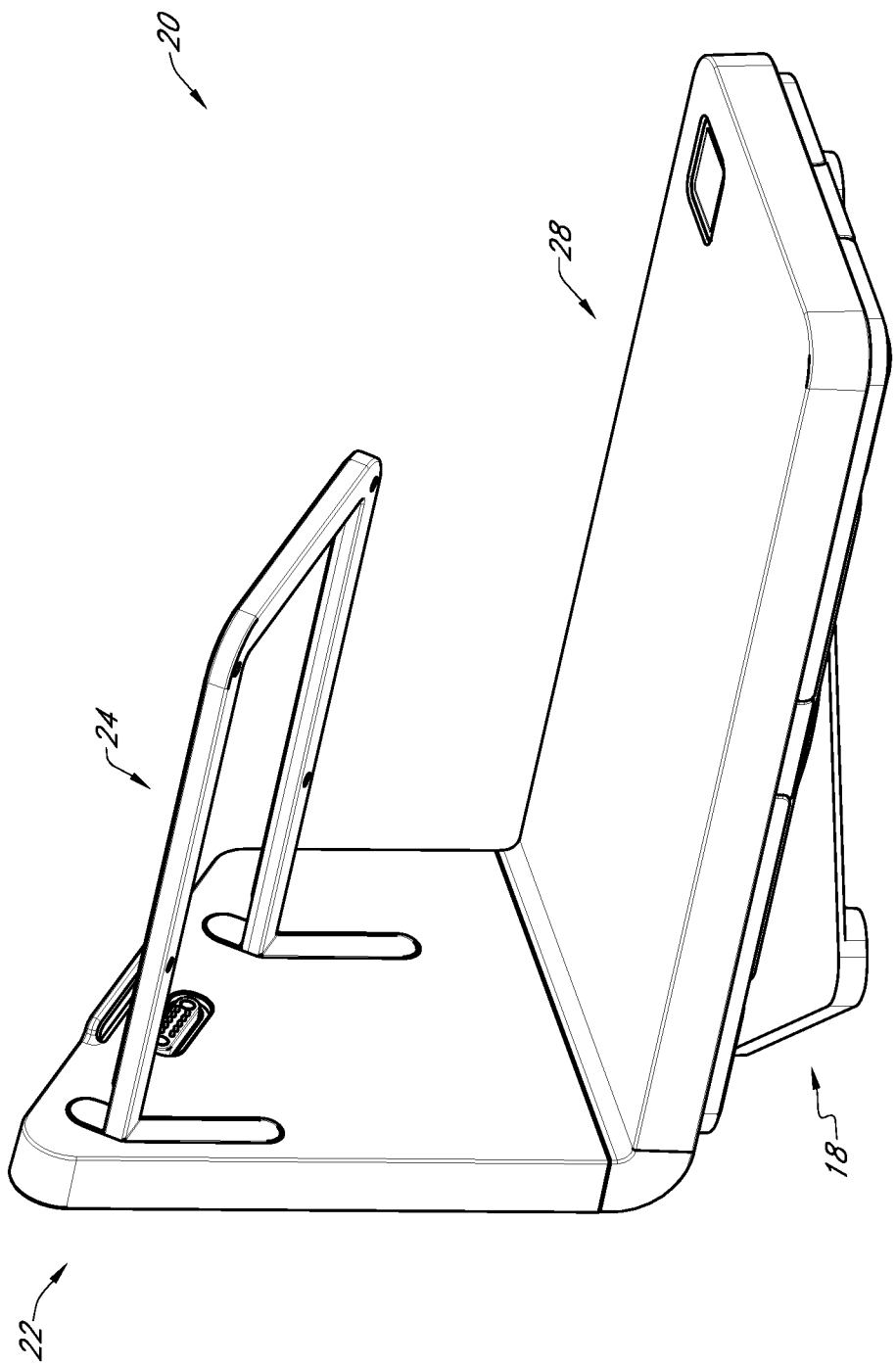
FIG. 23 is a top perspective view of the swivel platform assembly of FIG. 1 in a swiveled position coupled with the stand assembly of FIG. 10.

Turning to FIG. 23, depicted therein is a top perspective view of swivel platform assembly 10 in a swiveled position coupled with portable electronic device stand 20.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A swivel platform system for a portable electronic device stand, the swivel platform system comprising:
    (I) an upper assembly including
        a base member couplable to the portable electronic device stand; and
    (II) a lower assembly including
        a base member rotationally coupled to the base member of the upper assembly,
            wherein the base member of the lower assembly is coplanar with the base member of the upper assembly along a plane, and
        wherein the base member of the lower assembly is rotatable with respect to the base member of the upper assembly along an axis of rotation perpendicular to the plane
        wherein the bushing includes a flange coupled with the base member of the upper assembly,
        wherein the base member of the lower assembly further includes a collar, and
        wherein the bushing includes at least one prong portion coupled with the collar of base member of the lower assembly.

2. The swivel platform system of claim 1
    wherein the base member of the lower assembly is rotatable with respect to the base member of the upper assembly by no more than 180 degrees of rotation.

3. The swivel platform system of claim 1
    wherein the base member of the upper assembly includes an arced slot,
    wherein the lower assembly includes a tab portion perpendicularly protruding from the base member of the lower assembly,
    and wherein the tab portion of the lower assembly is coupled with the arced slot to limit extent of rotation of the base member of the lower assembly with respect to the base member of the upper assembly.

4. A swivel platform system for a portable electronic device stand, the swivel platform system comprising:
(I) an upper assembly including
a base member couplable to the portable electronic device stand; and
(II) a lower assembly including
a base member rotationally coupled to the base member of the upper assembly,
wherein the base member of the lower assembly is coplanar with the base member of the upper assembly along a plane, and
wherein the base member of the lower assembly is rotatable with respect to the base member of the upper assembly along an axis of rotation perpendicular to the plane,
wherein the base member of the upper assembly has two parallel extending elongated sides and two ends perpendicularly extending with respect to the two elongated sides, and
wherein the upper assembly includes at least one cover assembly extending from at least one of the two elongated sides.

5. The swivel platform system of claim 4 further including a bearing disk,
wherein the bearing disk is positioned between the base member of the upper assembly and the base member of the lower assembly.

6. The swivel platform system of claim 4
wherein the upper assembly includes fastener receptacles to receive fasteners for coupling with the portable electronic device stand.

7. A swivel platform system for a portable electronic device stand, the swivel platform system comprising:
(I) an upper assembly including
a base member couplable to the portable electronic device stand; and
(II) a lower assembly including
a base member rotationally coupled to the base member of the upper assembly,
wherein the base member of the lower assembly is coplanar with the base member of the upper assembly along a plane, and
wherein the base member of the lower assembly is rotatable with respect to the base member of the upper assembly along an axis of rotation perpendicular to the plane,
wherein the base member of the upper assembly has two parallel extending elongated sides and two ends perpendicularly extending with respect to the two elongated sides, and
wherein the upper assembly includes at least one cover assembly extending from one of the ends.

8. The swivel platform system of claim 7
wherein the base member of the upper assembly includes an aperture having a center located on the axis of rotation, and
wherein the base assembly of the lower assembly includes an aperture having a center located on the axis of rotation.

9. The swivel platform system of claim 7
wherein the lower assembly includes a collar,
wherein the bushing includes a collar coupled with the collar of the lower assembly.

10. The swivel platform system of claim 9
wherein the collar of the lower assembly includes at least one tab portion,
wherein the collar of the bushing includes at least one notch portion, and
wherein the at least one tab portion of the collar of the lower assembly are coupled with the at least one notch portion of the collar of the bushing.

11. A swivel platform system for a portable electronic device stand, the swivel platform system comprising:
(I) an upper assembly including
a base member couplable to the portable electronic device stand; and
(II) a lower assembly including
a base member rotationally coupled to the base member of the upper assembly,
wherein the base member of the lower assembly is coplanar with the base member of the upper assembly along a plane, and
wherein the base member of the lower assembly is rotatable with respect to the base member of the upper assembly along an axis of rotation perpendicular to the plane,
wherein the base member of the lower assembly has two parallel extending elongated sides,
wherein the base member of the upper assembly has an end, and
wherein the swivel platform system includes at least one text indicia provides an indication related to which of the two elongated sides is closest to the end at a rotational position of the base member of the upper assembly relative to the base member of the lower assembly when the end of the base member of the upper assembly is parallel with the two elongated sides of the base member of the lower assembly.

12. The swivel platform system of claim 11
wherein the upper assembly includes at least one magnetic member,
wherein the lower assembly includes at least one magnetic member, and
wherein the at least one magnetic member of the upper assembly magnetically engages with the at least one magnetic member of the lower assembly in at least one rotational position of the base member of the lower assembly with respect to the base member of the upper assembly.

13. The swivel platform system of claim 11
wherein the bushing includes a flange with at least one tick indicia,
wherein base member of the upper assembly includes a plurality of tick indicia,
wherein the at least one text indicia provides the indication based upon a predetermined alignment of the at least one tick indicia of the flange of the bushing with the at least one tick indicia of the base member of upper assembly.

14. A swivel platform system for a portable electronic device stand, the swivel platform system comprising:
(I) an upper assembly including
a base member couplable to the device stand;
(II) a lower assembly including
a base member rotationally coupled to the base member of the upper assembly,
wherein the base member of the lower assembly is rotatable with respect to the base member of the upper assembly along an axis of rotation; and
(III) a bushing,
wherein the bushing includes a flange coupled with the base member of the upper assembly, and wherein the bushing including at least one prong portion coupled with the base member of the lower assembly, wherein the base member of the upper assembly includes an arced slot, wherein the lower assembly includes a tab portion perpendicularly protruding from the base member of the lower assembly, and wherein the tab portion of the lower assembly is coupled with the arced slot to limit extent of rotation of the base member of the lower assembly with respect to the base member of the upper assembly.

15. The swivel platform system of claim 14
wherein the upper assembly includes at least one magnetic member,
wherein the lower assembly includes at least one magnetic member, and
wherein the at least magnetic member of the upper assembly magnetically engages with the at least one magnetic member of the lower assembly in at least one rotational position of the base member of the lower assembly with respect to the base member of the upper assembly.

16. The swivel platform system of claim 14
wherein the base member of the upper assembly includes an aperture having a center located on the axis of rotation, and
wherein the base assembly of the lower assembly includes an aperture having a center located on the axis of rotation.

17. A swivel platform system comprising:
a swivel platform assembly including:
(I) an upper assembly including
a base member couplable to the device stand;
(II) a lower assembly including
a base member rotationally coupled to the base member of the upper assembly,
wherein the base member of the lower assembly is coplanar with the base member of the upper assembly along a plane, and
wherein the base member of the lower assembly is rotatable with respect to the base member of the upper assembly along an axis of rotation perpendicular to the plane; and
a device stand including
(I) a lower assembly,
(II) a wall assembly coupled to the base, and
(III) a portable electronic device support assembly coupled to the wall assembly,
wherein the lower assembly of the device stand is coupled to the upper assembly of the swivel platform assembly.

18. The swivel platform system of claim 17
wherein the base member of the lower assembly has two parallel extending elongated sides,
wherein the base member of the upper assembly has an end, and
wherein the swivel platform system includes at least one text indicia provides an indication related to which of the two elongated sides is closest to the end at a rotational position of the base member of the upper assembly relative to the base member of the lower assembly when the end of the base member of the upper assembly is parallel with the two elongated sides of the base member of the lower assembly.

19. The swivel platform system of claim 18
wherein the bushing includes a flange with at least one tick indicia,
wherein base member of the upper assembly includes a plurality of tick indicia,
wherein the at least one text indicia provides the indication based upon a predetermined alignment of the at least one tick indicia of the flange of the bushing with the at least one tick indicia of the base member of upper assembly.

* * * * *